US011868136B2

(12) United States Patent
Benisch et al.

(10) Patent No.: US 11,868,136 B2
(45) Date of Patent: Jan. 9, 2024

(54) GEOLOCALIZED MODELS FOR PERCEPTION, PREDICTION, OR PLANNING

(71) Applicant: Woven by Toyota, U.S., Inc., Palo Alto, CA (US)

(72) Inventors: Michael Jared Benisch, Menlo Park, CA (US); Ashesh Jain, Sunnyvale, CA (US)

(73) Assignee: Woven by Toyota, U.S., Inc., Palo Alto, CA (US)

( * ) Notice: Subject to any disclaimer, the term of this patent is extended or adjusted under 35 U.S.C. 154(b) by 653 days.

(21) Appl. No.: 16/721,604

(22) Filed: Dec. 19, 2019

(65) Prior Publication Data

US 2021/0191407 A1 Jun. 24, 2021

(51) Int. Cl.
*G05D 1/02* (2020.01)
*G06N 20/00* (2019.01)

(52) U.S. Cl.
CPC ......... *G05D 1/0219* (2013.01); *G05D 1/0214* (2013.01); *G05D 1/0221* (2013.01); *G05D 1/0289* (2013.01); *G06N 20/00* (2019.01)

(58) Field of Classification Search
CPC .. G05D 1/0214; G05D 1/0219; G05D 1/0221; G05D 1/0289; G05D 1/0038;

(Continued)

(56) References Cited

U.S. PATENT DOCUMENTS 10,386,836 B2 * 8/2019 Lockwood et al. . G05D 1/0214
11,126,180 B1 * 9/2021 Kobilarov .......... B60W 30/095
(Continued)

FOREIGN PATENT DOCUMENTS

JP 2005122263 A 5/2005
JP 2018173816 A 11/2018
(Continued)

OTHER PUBLICATIONS

International Search Report and Written Opinion for International Application No. PCT/US2020/065987, dated May 4, 2021.

*Primary Examiner* — Aniss Chad
*Assistant Examiner* — Chase L Cooley
(74) *Attorney, Agent, or Firm* — Christopher G. Darrow; Darrow Mustafa PC

(57) ABSTRACT

In one embodiment, a method includes, by a computing system associated with a vehicle, determining a current location of the vehicle in a first region, identifying one or more first sets of model parameters associated with the first region and one or more second sets of model parameters associated with a second region, generating, using one or more machine-learning models based on the first sets of model parameters, one or more first inferences based on first sensor data captured by the vehicle, switching the configurations of the models from the first sets of model parameters to the second sets of model parameters, generating, using the models having configurations based on the second sets of model parameters, one or more second inferences based on second sensor data generated by the sensors of the vehicle in the second region, and causing the vehicle to perform one or more operations based on the second inferences.

20 Claims, 21 Drawing Sheets

(58) Field of Classification Search
CPC ...... G05D 1/0646; G05D 1/102; G06N 20/00;
B60W 60/001; B60W 2050/0028; B60W
2050/0088; C07K 16/00; C07K 2317/00;
A61K 2039/505; A61P 35/02; B64C
2201/127; B64C 39/024; G01C 21/20;
G06F 16/29; G08G 5/0013; G08G
5/0026; G08G 5/0034; G08G 5/0039;
G08G 5/0069; G08G 5/0086; G08G
5/045
See application file for complete search history.

(56) References Cited

U.S. PATENT DOCUMENTS

| | | | |
|---|---|---|---|
| 11,195,418 B1* | 12/2021 | Hong | G06N 3/0454 |
| 11,243,532 B1* | 2/2022 | Levihn | G06N 3/045 |
| 2015/0035662 A1 | 2/2015 | Bowers | |
| 2017/0243121 A1* | 8/2017 | Lai | G08G 1/0129 |
| 2019/0294934 A1* | 9/2019 | Shestak | G06V 20/588 |
| 2019/0311272 A1* | 10/2019 | Kamata et al. | B60W 50/0097 |
| 2020/0081134 A1* | 3/2020 | Wheeler | G01S 13/862 |
| 2020/0364508 A1* | 11/2020 | Gurel et al. | G06V 20/41 |

FOREIGN PATENT DOCUMENTS

| | | | | |
|---|---|---|---|---|
| WO | WO 2010089661 A2 | 8/2010 | | |
| WO | WO 2018218155 A1 * | 5/2017 | | H04W 4/44 |
| WO | WO-2018218155 A1 * | 11/2018 | | G01C 21/32 |
| WO | WO 2021126170 A1 * | 12/2019 | | G01C 21/36 |

\* cited by examiner

GEOLOCALIZED MODELS FOR PERCEPTION, PREDICTION, OR PLANNING

BACKGROUND

A modern vehicle may include one or more sensors or sensing systems for monitoring the vehicle and environment, and may use data gathered from the sensors to make inferences related to the present and future states of the environment. These inferences may be used in tasks related to detection and classification of objects in the environment and planning of routes for the vehicle. Inferences may be made using statistical models, which may be configured, using appropriate parameters, to generate the inferences based on representations of the environment. The parameters of the statistical models may be configured based on training data that specifies correspondences between particular inputs, e.g., environment representations, and outputs, e.g., inferences such as object classifications or routes. The models may subsequently be used to generate inferences based on sensor data collected as the vehicle drives through new, previously-unseen environments. The models may identify outputs that correspond to inputs similar to the ones represented by the sensor data, and the identified outputs may be the inferences generated for the sensor data.

For example, the vehicle may use one or more cameras or LiDAR to detect objects in the environment surrounding the vehicle. The vehicle may use one or more computing systems (e.g., an on-board computer) to collect and process data from the sensors. The computing systems may generate inferences based on the data using statistical models stored in on-board storage space or downloaded from a cloud using a wireless connection, and use the inferences to operate the vehicle.

DESCRIPTION OF EXAMPLE EMBODIMENTS

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Figure 1A:
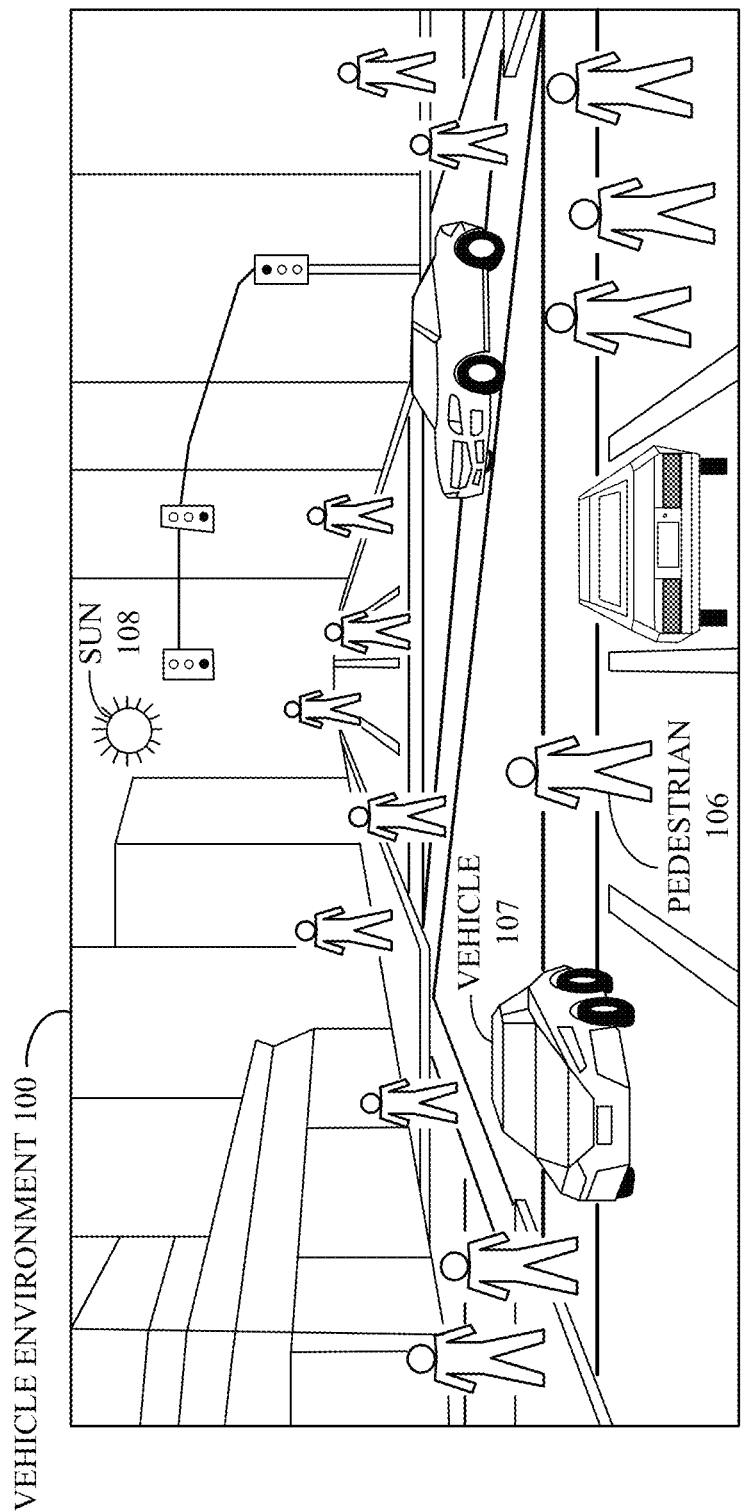
FIG. 1A illustrates an example vehicle environment that includes a busy intersection with vehicles and numerous pedestrians.

FIG. 1A illustrates an example vehicle environment 100 that includes a busy intersection with vehicles 107 and numerous pedestrians 108. A computing system may use various models, referred to herein as machine-learning models, that have been trained to perform tasks related to controlling a vehicle's operation. The tasks may include perception-related tasks, prediction-related tasks, and planning-related tasks, among others. These models are ordinarily trained to infer results in environments that are sufficiently similar to other environments (on which the model has been trained) so that the model can identify the correct results. The similarity between two environments may be determined by comparing representations of the two environments using a suitable metric, such as the positions, shapes, sizes, or number of particular features in each of the environments. It is difficult to train generalized models to recognize unusual environments or to know how to respond appropriately to unusual circumstances. Unusual environments may be, for example, environments that have one or more unusual features, road conditions, objects, and/or situations. Unusual environments may have one or more features in common with typical environments, such as the same types of objects, same types of roads, same types of traffic patterns, and so on. Thus, an unusual environment may differ from typical environments in at least one characteristic, such as having an unusual feature, road condition, object, situation, road type, traffic pattern, or the like, while having other characteristics that are the same as or similar to features of typical environments. For example, the vehicle environment 100 shown in FIG. 1A includes several pedestrians 106 located in traffic lanes of the streets, which are unusual locations for pedestrians. Further, the vehicle environment 100 includes a diagonal crosswalk across an intersection, which may be an unusual feature. Pedestrians are likely to be located on the diagonal crosswalk, particularly when the traffic signal permits them to use the crosswalk. The relative rarity of unusual environments causes difficulty in training generalized machine-learning models to recognize them and respond to them appropriately. Generalized machine-learning models are trained based on many different environments where the majority of events/training data are not unusual features or events. As such, the generalized models tend to be better at recognizing and responding to the usual, commonly-occurring environments. This can conflict with the goal of recognizing and responding to the specifics of local environments. It is difficult to train generalized models to make correct inferences for both typical and unusual environments. Further, machine-learning models that are generalized for different environments are designed to recognize patterns that occur at different environments in different geographic locations. Typical environments or features can be expected to be more likely to occur at multiple different geographic locations than would be unusual environments or features. Thus, machine-learning models may be trained to work well globally, e.g., at numerous different locations and/or at different locations that are geographically distributed across large distances. Training a globalized model on "local" environments or features that are specific to particular locations can produce overfitting, in which a model performs well in a particular location but poorly in other locations.

For example, prediction models may predict future locations or movement (e.g., trajectories) of objects detected in the environment. The locations of pedestrians affects the performance of prediction models. Prediction models that are not necessarily trained on the unusual environments of intersections having diagonal crosswalks may make predictions about the movement or locations of pedestrians that are different from those a human driver or prediction models trained on intersections having diagonal crosswalks would make. Further, prediction models that are trained on streets or intersections having few pedestrians may make predictions that are different from those a human driver or prediction models trained on streets or intersections having pedestrians would make. For example, a generalized prediction model may be unable to predict the trajectories of pedestrians 106 located in the driving lanes (e.g., no prediction), or may predict partially incorrect (e.g., correct direction but too fast or to slow) or completely incorrect (e.g., wrong direction and speed) trajectories for the pedestrians 106. These different predictions may be partially or completely incorrect, and may result in less-efficient or incorrect vehicle operations.

Perception models may perform perception-related tasks such as identifying the locations and types of objects in the environment such as the pedestrian 106 and vehicle 107. Perception tasks may be affected by lighting conditions, which can be related to the vehicle environment. For example, in the vehicle environment 100, the sun 108 may be very bright. The light of the sun 108 may be blocked by obstructions in the environment, such as buildings, at certain times. Thus, the vehicle environment 100 may have unusual lighting characteristics that are not used as factors by models when making perception-related inferences. A model that is not trained on such local lighting conditions may identify or classify objects differently from a human or a model that is trained on such lighting conditions, since image recognition operations may be affected by the bright light from the sun 108. These different object identifications or classifications may be incorrect, and may result in less-efficient or incorrect vehicle operations.

Planning models may perform planning-related tasks such as determining paths for a vehicle to follow. A planning model may identify a set of potential maneuvers or trajectories to take in the intersection of the vehicle environment 100, and may also identify corresponding likelihoods that each trajectory should be performed. A planning module of the vehicle system (or another module) may select one of the trajectories for use, e.g., the trajectory having the highest likelihood. The planning model may identify these potential trajectories and their likelihoods based on the topology of the intersection, which may include the diagonal crosswalk, and/or the locations of the pedestrian 106 and vehicle 107. For example, the planning model may have been trained or otherwise configured to identify potential trajectories based on intersections that do not have diagonal crosswalks. Upon encountering unusual environments such as the diagonal crosswalk, such a planning model may identify potential trajectories that are different from those a human driver or a planning model trained or otherwise configured to process the unusual environment (e.g., intersections having diagonal crosswalks) would make. These different identified trajectories may be incorrect, and may result in less-efficient or incorrect vehicle operations.

These problems training generalized models to make correct inferences for both typical and unusual vehicle environments are difficult to solve because, for example, including the unusual vehicle environments in the training data with sufficient weight (e.g., number of example environments) to produce a model that produces correct inferences for the unusual environments can cause overfitting errors in which the model produces incorrect inferences for the typical environments. Thus, it is difficult to train generalized perception, prediction, or planning models to make correct inferences for both typical and unusual environments.

The performance of the model, e.g., how well the model performs its tasks, may be related to how similar the newly-encountered environments are to the environments used to train the model. Thus, the models are ordinarily trained on substantial quantities of data that are, in aggregate, similar to the average (e.g., common) vehicle environments that are expected to be encountered frequently. If the training data is not sufficiently specific, e.g., contains few pedestrians, then the models may produce underfitting errors. If the training data is too specific, e.g., contains many examples that are substantially different from the average vehicle environment, then the models may produce overfitting errors. Thus, to produce models that perform well in commonly-encountered environments, training processes often use training data that is similar to the commonly-encountered environments, and attempt to minimize overfitting and underfitting errors. However, training a generalized model to perform well for unusual environments that are rare and for commonly-encountered environments is difficult and may not be feasible.

Figure 1B:
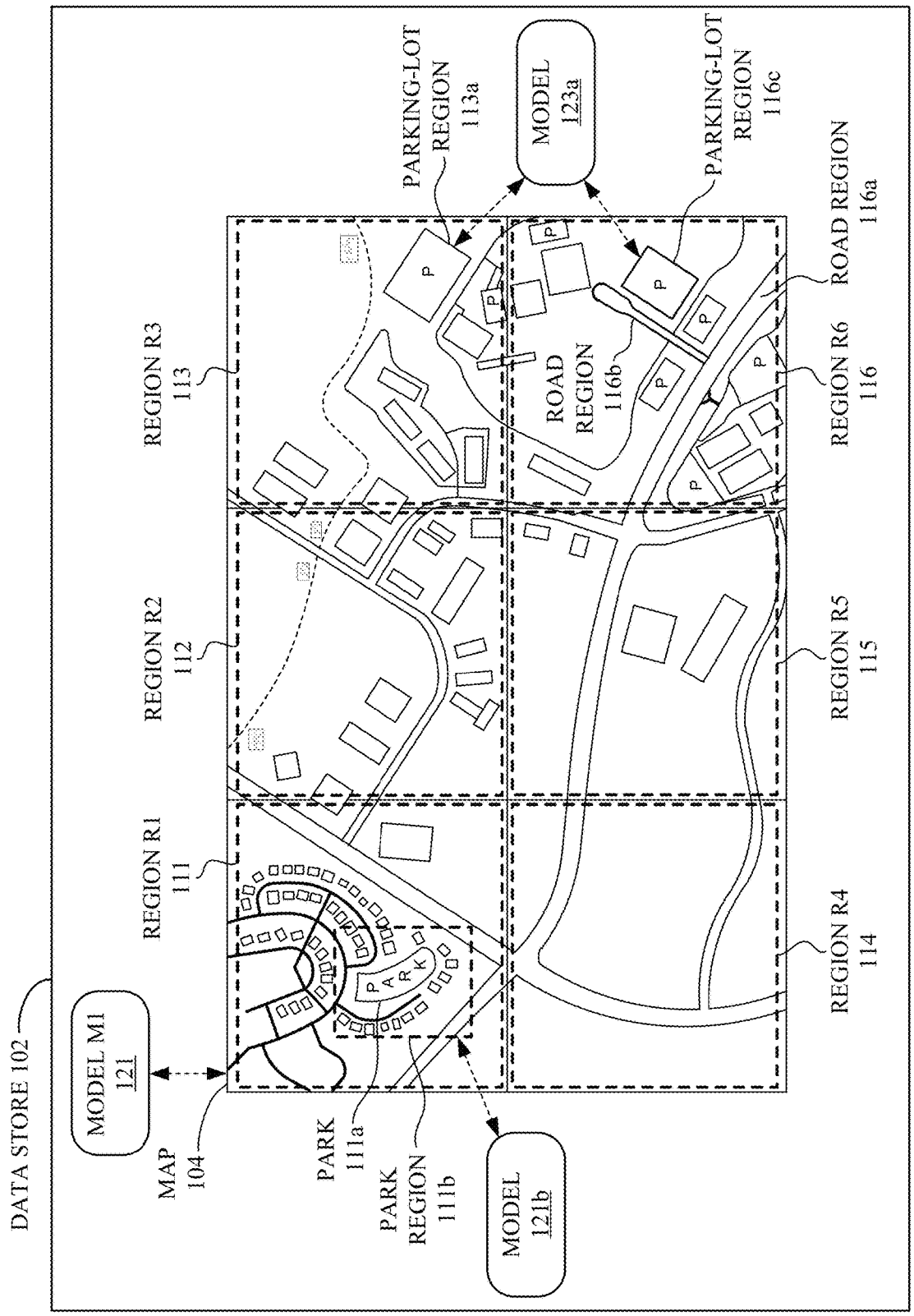
FIG. 1B illustrates an example map divided into regions.
Figure 1C:
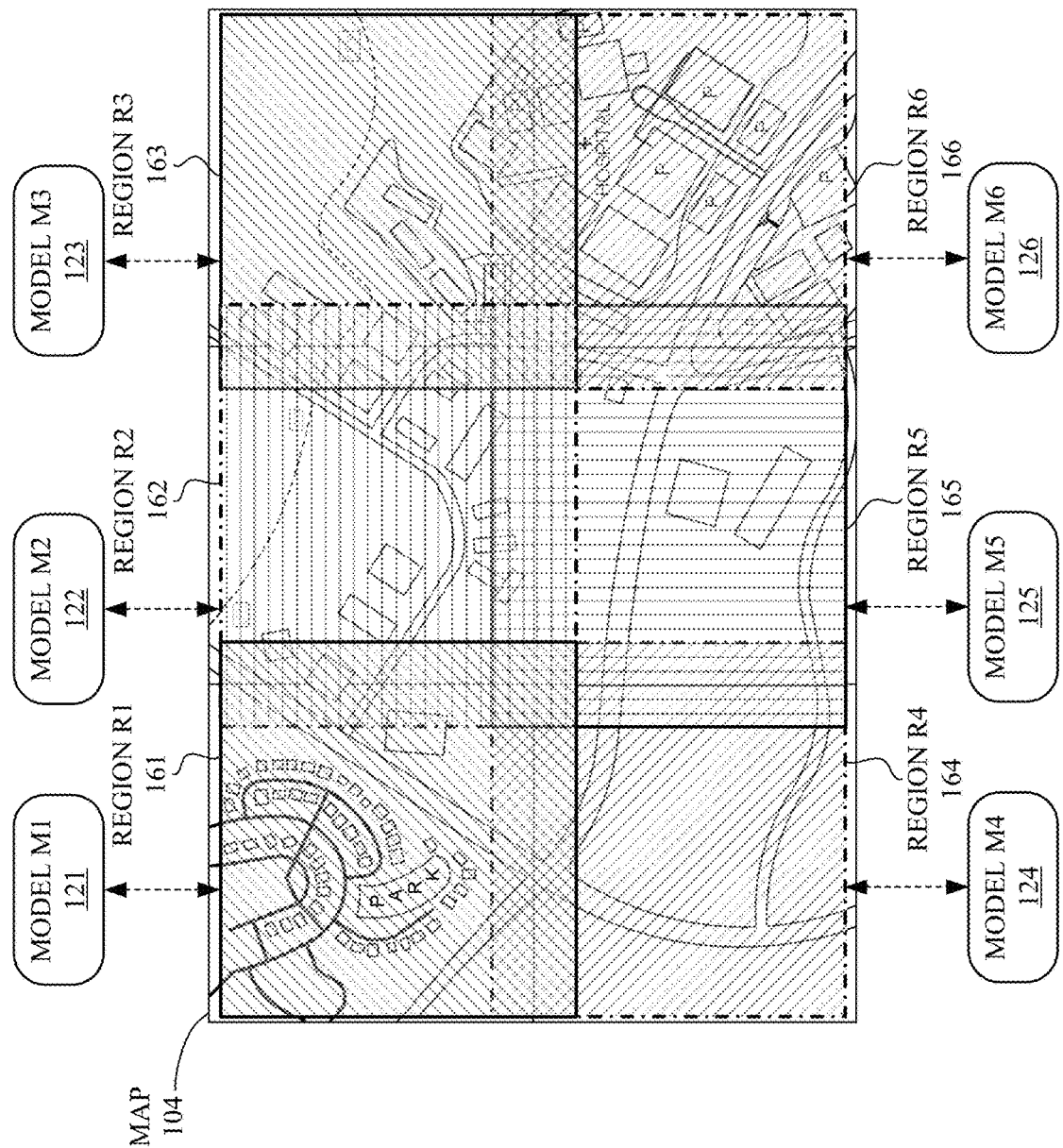
FIG. 1C illustrates an example map divided into partially-overlapping regions associated with models.

FIG. 1B illustrates an example map divided into regions. In particular embodiments, machine-learning models that perform tasks such as perception, prediction, or planning can be trained and used in map regions in which unusual or rare environments may be expected, while other generalized models can be used in other regions. Additionally and/or alternatively, separate localized machine-learning models can be trained for each road segment that a vehicle may travel without the use of a "generalized" model. Dividing the map 104 into regions 111-116, which may be, e.g., geographical areas, road segments, or the like, training regions-specific models on one or more of the regions 111-116 (instead of on the entire map 104), and using the region-specific models to make inferences in their respective regions provides a solution to the problem of training generalized perception, prediction, or planning models to make correct inferences for both typical and unusual environments. In particular embodiments, the map 104 may be divided into any number of regions. One or more of the regions may subsequently be associated with corresponding region-specific models (as shown in FIG. 1C). The region-specific models may be trained based on data associated with the region. Subsequent to being trained, each region-specific model may be used to make inferences when the vehicle is in the region associated with that model, e.g., to make inferences related to perception, predictions, and/or planning for vehicles located in the model's associated region. The regions with which the generalized model is associated may be, for example, regions having a relatively large number of typical environments in which the generalized model 121 performs well (e.g., above a threshold performance). Regions that are associated with the generalized model are not ordinarily associated with a region-specific model. A region-specific model may be associated with a region or feature that is unusual in comparison to other features or regions. Training a model specifically for an unusual region may produce a model that performs better than a generalized model in the unusual region. Region-specific models may be associated with regions having a relatively large number of unusual environments or features in which the generalized model 121 does not perform well (e.g., below a threshold performance). A vehicle may use a first model associated with a first region to make inferences while the vehicle is located in the first region. When the vehicle moves into a second region, the vehicle may switch to a second model associated with the second region, and use the second model to make inferences while the vehicle is located in the second region. In this way, inferences are made using models specifically trained on the regions, and unusual environments or features can be handled by the models without affecting the generalized model's performance in other regions.

Although overfitting is typically a problem, particular embodiments may benefit from the use of overfitting in geographic regions. The region-specific models have thus been trained specifically on their associated regions, and may be overfitted to the features and events that are specific to their associated regions in comparison to other regions of the map. However, since the vehicle uses each model in the model's associated regions, but not in other regions, each model produces accurate results in its associated region. Further, each model may produce results that are more accurate than a generalized model that has been trained on larger regions, because the models for specific regions can be trained to make inferences based on unusual vehicle environments in their associated regions that are rare in other regions. Thus, using models trained for specific regions when the vehicle is located in those regions has advantages over generalized models trained for common regions because the region-specific models can generate correct results in unusual regions. The regions-specific models advantageously use localized training that would cause overfitting errors in generalized models, without the disadvantages of localized training, since each region-specific model is not ordinarily used in other regions.

In particular embodiments, models may be trained using data that represents particular input scenarios, such as particular vehicle environments, e.g., scenes, containing roads, intersections, vehicles, pedestrians, and other objects, and particular corresponding outputs, such as subsequent movement of the objects or actions that the vehicle performs. A trained model may be represented as a set of parameters, e.g., weights, determined during the training process. The trained model may then perform tasks such as perception, prediction, and planning in newly-encountered environments by determining the appropriate outputs for the newly-encountered environments according to the model's training. For example, a prediction model may predict the likely current or future driving behavior of a particular nearby vehicle based on its past behavior. The prediction model may be, for example, a neural network model including a number of weight factors and parameters to be adjusted during the training process. The prediction model may be trained using past driving behavior data collected by, for example, a fleet of data-gathering vehicles. During the training process, a number of weighting factors of the prediction model may be adjusted based on comparisons between the known behaviors of the observed vehicles (the ground truth) and the predicted behaviors of those vehicles generated using the current weighting factors of the prediction model.

In particular embodiments, the switching of models introduced above may be performed when the vehicle enters the second region (e.g., by crossing a boundary between the first and second regions). However, the first and second models may produce substantially different results for the same or similar environments, so switching abruptly between models may result in unexpected or undesirable vehicle behavior, such as a sudden change in speed or heading. Thus, one or more smoothing techniques may be used to reduce the difference in results when the model switch occurs. For example, region boundaries may be extended so that each region partially overlaps each adjacent region, and the training of the models associated with each region may include the overlapping areas. The switch between models may be performed when the vehicle is in the overlapping region, thereby reducing or eliminating abrupt changes in vehicle operation. As another example smoothing technique, when the vehicle is in a first region, heading toward a second region, and within a threshold distance of the second region, first and second prediction models associated with the first and second regions, respectively, may be used to generate first and second predicted trajectories for the vehicle. The trajectories may be compared to identify a minimum distance between them, and the switch between models may then be made when the vehicle is at the location of the minimum distance.

In particular embodiments, region-specific models may be associated with regions based on the performance of other models associated with larger enclosing regions. When the performance of a model associated with a larger region is below a performance threshold, then the larger region may be divided into two or more sub-regions, and new region-specific models may be associated with and trained for each new sub-region. The sub-regions may be equal-size sub-regions, or may have sizes or shapes based on topological features of the map, or based on other features such as traffic flow. Note that the term sub-region is used for explanatory purposes to refer to the result of dividing a larger region, and a sub-region may otherwise be understood as being the same as a region, so the terms region and sub-region may be used interchangeably.

In particular embodiments, a computing system may include modules for different types of tasks such as perception, prediction, and planning. Different tasks can involve different types of models, which can be trained differently, so the process of creating region-specific models can produce different region-specific models (which can be mapped to different map regions) for each type of task. As a result, each of the computing system modules may be associated with a different set of inference models. The perception module may be associated with a set of perception models, the prediction module can be associated with a set of prediction models, and the planning module can be associated with a set of planning models. Each different set of inference modules may include one or more region-specific models that are trained to perform type of task associated with the set of models. The perception models can include, e.g., three region-specific perception models associated with three corresponding regions of a map. The prediction models can include, e.g., four region-specific prediction models associated with four corresponding regions of the map. The planning models can include, e.g., three region-specific planning models associated with three corresponding regions of the map. These sets of perception models, prediction models, and planning models, and their corresponding map regions, may be generated by a process that identifies map regions to be associated with inference models, trains the inference models based on the associated map regions, and, if appropriate (e.g., to improve model performance), splits map regions into multiple sub-regions having different sub-region-specific inference models. As a result of using different inference models with each type of task, the models for a particular type of task use different region-specific models than other tasks. As the map regions may be generated based on the region-specific models (e.g., on the performance of the region-specific models), each type of task may have map regions that are shaped and arranged differently than the map regions for the other types of tasks.

The map 104 is divided into six regions 111-116 of equal size. The regions are separated by boundaries. Each region 111-116 is shown as being enclosed by a rectangle having a dashed line. The rectangles formed by the dashed lines are shown as being slightly smaller than the areas of the regions 111-116 for purposes of illustration and labeling of the regions. However, the regions 111-116 cover the entire map 104 in this example, and the region boundaries are shown as solid lines. The map 104 may be divided into any suitable number of regions of any suitable sizes or shapes according to any suitable criteria or map division (e.g., partitioning) technique. Example map division techniques that may be used include dividing into a specified number of equal-size regions, dividing into regions of specified sizes, dividing into regions of random size and shape, subject to constraints such as minimum and maximum area limits, number of sides, angles, or curves per region, and the like, dividing into regions according to map topology, or dividing into regions based on other characteristics of the regions. For example, one or more regions may conform to the shapes of corresponding roads, road intersections, lanes, or other features of the map 104. Thus, for example, a different region may be created for each road segment having a length between a minimum length and a maximum length. Each region for a road segment may have the same boundaries as the road segment, or may have boundaries that are a predetermined distance from the road segment, so that the shape of the region may be similar to but larger than the shape of the road segment. As another example, a region may be created for each intersection that satisfies criteria such as being of at least a minimum size (e.g., square units of area), having at least a minimum amount of traffic flow, having at least a minimum number of lanes, and so on. Each region for an intersection may have the same boundaries as the intersection, or may enclose an area larger or smaller than the intersection, e.g., a rectangle, bounding box, or circle that encloses the intersection. In other examples, regions may be created based on the density of roads, intersections, buildings, houses, and/or other map features. As an example, an area of at least a threshold size (e.g., square units of area) having less than a threshold density of roads may form a first region, and an adjacent area having more than the threshold density of roads and less than a threshold maximum region size may form a second region. Although particular examples of dividing maps into regions are described herein, any suitable technique may be used to divide a map into regions. As another example, a map or a region of a map may be divided, based on characteristics of the map or region, into two or more regions, which may be referred to herein as sub-regions. The characteristics may include map information such as the types of map features, e.g., freeway, freeway on-ramp or off-ramp, highway, city street, neighborhood/residential street, traffic circle, crosswalk, school, park, shopping center, business district, unpaved road, speed limit (on roads), bridge, ferry, parking lot, and so on. The characteristics may alternatively or additionally include information that changes more frequently, such as traffic conditions, average speed on roads, presence of school zones, presence of road construction or road closures, accident reports, and so on.

A region may be identified (e.g., delineated) based on the locations of one or more characteristics, e.g., so that the boundary of an area or map feature having one or more of the characteristics forms a boundary of a region. Alternatively or additionally, a region may be identified based on locations of one or more characteristics, but the boundary of the area of the region may be larger than the area or map feature having the characteristics. For example, a park 111*a* does not have any roads within its boundary, but roads near the park may be affected by the presence of the park (e.g., pedestrians may walk to and from the park via roads near the park). A park region 111*b* may be identified based on the park 111*a*. The boundary of the park region 111*b* may be generated by expanding the boundary of the park 111*a* by a threshold distance on each side of the park 111*a* to include roads near the park 111*a*. The boundary of the park region 111*b* is thus shown as a rectangle that encloses roads within a threshold distance of the park.

In another example, the region 113 may include a parking lot region 113*a*. The region 116 may include a road region 116*a* (which includes a road), another road region 116*b* (which includes another road leading to a parking lot), and a parking-lot region 116*c* (which includes the parking lot). The boundaries of the parking-lot regions 113*a*, 116*c* and the boundaries of the road regions 116*a*, 116*b* may correspond to the boundaries of the map features enclosed by those regions. Thus, for example, the boundary of the parking-lot region 113*a* may be the same as the boundary of the parking lot based on which the parking-lot region 113*a* is identified. In other examples, one or more of the boundaries of the regions may be larger than the feature (e.g., the parking lot) enclosed by the regions, e.g., by a threshold distance, similar to the expansion of the boundary of the park 111*a* to enclose nearby roads, as described above.

In particular embodiments, each of the regions 111-116 may be associated with a corresponding machine-learning model. A generalized model 121 may be associated with regions of the map that are not associated with region-specific models 121*b*, 123*a*. For example, as shown in FIG. 1B, the entire map 104 may initially be associated with the generalized model 121 (prior to associating any region-specific models). The generalized model 121 may be used to make inferences for the regions of the map with which it is associated (and which are not associated with other models). A region-specific model 121*b* may be associated with the park region 111*b* if, for example, vehicles are generally driven differently in the park region 111*b* than in other areas of the map 104. If vehicles are generally driven differently in different park regions, then different park regions may be associated with different models. As another example, two parking-lot regions 113*a*, 116*c* are associated with a single region-specific model 123*a* because vehicles are generally driven the same in different parking lots. Road region 116*a*, which corresponds to a road, is separate from the enclosing region 116 and associated with a road-specific model (not shown) because vehicles are generally driven differently on the corresponding road than in other areas of the enclosing region 116. Another road-region 116*b* that leads to the parking lot region 116*c* is also associated with the road-specific model (not shown) because vehicles are generally driven the same in both road regions 116*a*, 116*b*. In particular embodiments, the model for an enclosing map or region, such as the model 121 associated with the map 104, is not used in smaller regions such as regions 116, 116*a*, 111*c* that are associated with different models, as the different models are used for those smaller regions instead of the models associated with the enclosing map or region.

The generalized model 121 may be trained on the entire map 104, or on one or more of the regions 111-116 not associated with region-specific models 121*b*, 123*a*, 126*a*. The generalized model 121 may be trained on the map 104, and each of the region-specific models may be created by copying the generalized model 121. The region-specific models may then be trained on training data associated with, e.g., received in, the corresponding regions. Training data associated with a region may be, e.g., training data captured or detected by sensors of a vehicle when the vehicle was located in the region. As another example, training data associated with a region may include training data having one or more associated locations that are in the region. Training data may include, for example, such as sensor data and associated driver actions or vehicle operations.

Although different regions are described herein as being associated with different models, the regions may alternatively be associated with a single model that may be configured differently for different regions using a different set of parameters for each region. Thus, the term "model" may refer to a model configured with a particular set of parameters, and different models may refer to the same model configured with different sets of parameters. So, for example, the term "region-specific model" may refer to a region-specific set of model parameters being used with a region-independent model to form a region-specific model. The region-independent model may include, for example, program code or instructions for generating inferences based on parameters that may be changed by loading different parameters into the model. Thus, each model may be configured according to a set of model parameters, e.g., weights or the like determined in a training process. A model may be configured for use in a particular region by loading a set of parameters associated with that region into the model. Although the map 104 is shown as being divided into a particular number of regions 111-116 having particular shapes and sizes, in other examples the map 104 may be divided a different number of regions, which may each be of a different size and/or shape. The region boundaries are thus not necessarily straight lines.

FIG. 1C illustrates an example map 104 divided into partially-overlapping regions 161-166 associated with models 121-126. The regions 161-166 are similar to the regions 111-116 of FIG. 1B, but are partially-overlapping. The partially-overlapping regions may be used to smooth transitions between pairs of the models 121-126 that may occur when switching to a new (e.g., different) one of the models 121-126 as a result of a vehicle moving into a new (e.g., different) one of the regions 161-166. For example, the vehicle may use a first model 121 associated with a first region 161 to make inferences while the vehicle is located in the first region 161. When the vehicle moves into a second region 162, the vehicle may switch to a second model 122 associated with the second region 162, and use the second model 122 to make inferences while the vehicle is located in the second region 162. This switching of models may be performed when the vehicle enters the second region (e.g., by crossing a boundary between the first and second regions). However, the first and second models 121, 122 may produce substantially different results for the same or similar environments, so switching abruptly between models may result in unexpected or undesirable vehicle behavior, such as a sudden change in speed or heading. Thus, one or more smoothing techniques may be used to reduce the difference in results when the model switch occurs. For example, region boundaries may be extended so that each of the regions 161-166 partially overlaps each adjacent region, and the models 121-126 associated with the regions may be trained on the overlapping areas (in addition to the non-overlapping areas of their respective regions) so that each pair of adjacent models is coherent in the overlapping area of the pair of regions associated with the pair of adjacent models. The switch between models may be performed when the vehicle is in the overlapping region, thereby reducing or eliminating abrupt changes in vehicle operation.

In FIG. 1C, each of the regions partially overlaps two or more other regions. For example, region 161 partially overlaps regions 162, 164, and 165. Thus, a vehicle traveling between any two regions of the map 104 passes through an area in which the two regions overlap. Each of the regions 161-166 is associated with a corresponding model 121-126. Each model 121-126 may be trained on data (e.g., driving events and the like) associated with locations within the boundaries of the corresponding one of the regions 161-166 (but not, in particular embodiments, with data not associated with the corresponding one of the regions 161-166). Thus, for example, model 121 may be trained based on training data associated with any location in region 161, which may include the area of region 161 not overlapped by any other regions, as well as the areas of region 161 that overlap regions 162, 164, and 165 (but not on training data associated with locations not in those areas). Similarly, each of the regions 162-166 may be trained on training data associated with the non-overlapped of overlapped areas of the respective regions. When a vehicle moves from one region to another, e.g., from region 161 to region 162, the switch from the model 121 (e.g., from the model parameters associated with region 161) to model 122 (e.g., to the model parameters associated with region 162) may be performed when the vehicle is in the area in which regions 161 and 162 overlap (e.g., the right-side portion of region 161 and the left-side portion of region 162 shown in FIG. 1C). In particular embodiments, the overlapping regions may include traffic events to provide training data for the first and second models. Thus, the first and second regions may be defined such that there is at least one intersection in their overlapping common area.

Figure 1D:
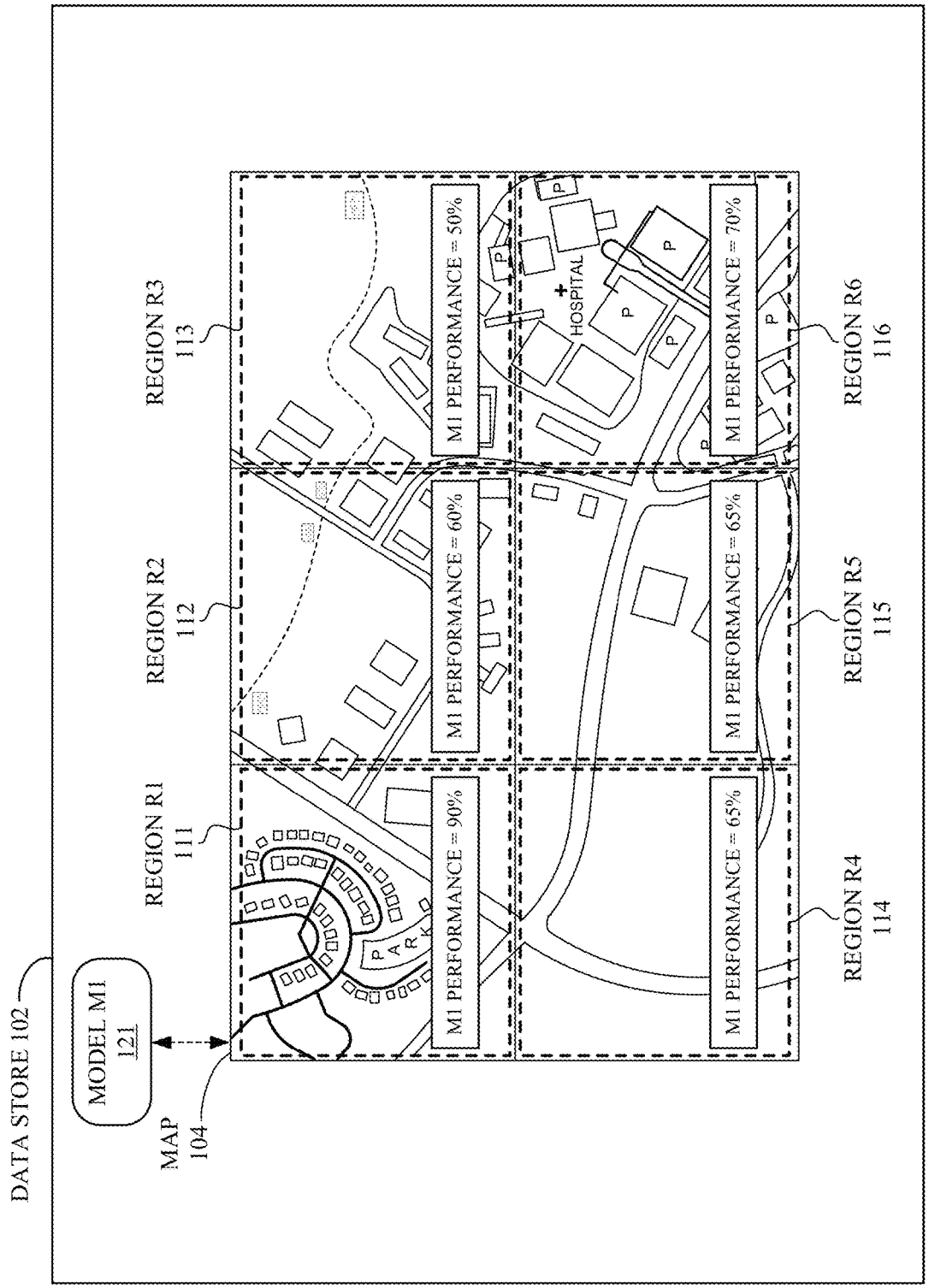
FIG. 1D illustrates an example map associated with a single model and divided into regions having associated performance assessments.

FIG. 1D illustrates an example map associated with a single model 121 and divided into regions 111-116 having associated performance assessments. The performance assessments may be generated for the regions shown by using techniques based on simulation, feedback from human drivers, or a combination thereof. A performance assessment may produce a number of measures of the quality or correctness of a model's output according to different performance metrics, e.g., precision, recall, and so on. The example performance assessments shown in FIG. 1D are expressed as a single number for each model. The number is a percentage and may be based on one or more performance metrics, e.g., as an average of the multiple performance metrics converted to a percentage. Thus, in this example, model performance may range from 0% (worst performance) to 100% (best performance). Although performance is measured as a percentage value in the examples described herein, there are many different ways to measure and represent performance, and different types and/or values of thresholds that may be used. In other examples, performance may be classified into particular safety ratings (e.g., A, B, C, 1, 2, 3). Further, other performance metric thresholds may be used. For example, instead of specific percentage thresholds, performance metric thresholds may be inherently normalized through the metrics themselves for each time of model (or combination of models, if multiple models are evaluated together). As another example, performance may be measured based on passenger comfort ratings, abruptness of speed or direction changes, fuel efficiency, and so on.

FIG. 1D shows example performance measures for the generalized model 121 when the model is used to generate inferences on each of the regions 111-116. The example values are shown for explanatory purposes, and the performance of a model on the regions may produce other values in other examples. The performance assessments shown in FIG. 1D for the generalized model 121 include a performance of 90% on region 111, 60% on region 112, 50% on region 113, 65% on region 114, 65% on region 115, and 70% on region 116. The model 121 may perform differently on different regions because of differences in the environments of the different regions. In this example, model 121 performs well on region 111 (region 111 may be similar to the regions on which model 121 was trained).

In particular embodiments, a threshold model performance value may be used to determine whether to create and associate a new model with a particular region. In the examples described herein, the threshold model performance is 80%. Any example model performance assessments below 80% result in the model being replaced with one or more region-specific models in the examples described herein. Thus, the generalized model 121 will be replaced with region-specific models in regions 112-116 because the performance assessments for those regions are below 80%. Other threshold values, or other model replacement criteria, may be used in other examples. For example, instead of using an absolute threshold value, models having performance that differs from an average performance of the models by more than a threshold percentage may be replaced with region-specific models. The region-specific models created for regions 112-116 are shown in FIG. 1E and described below.

Figure 1E:
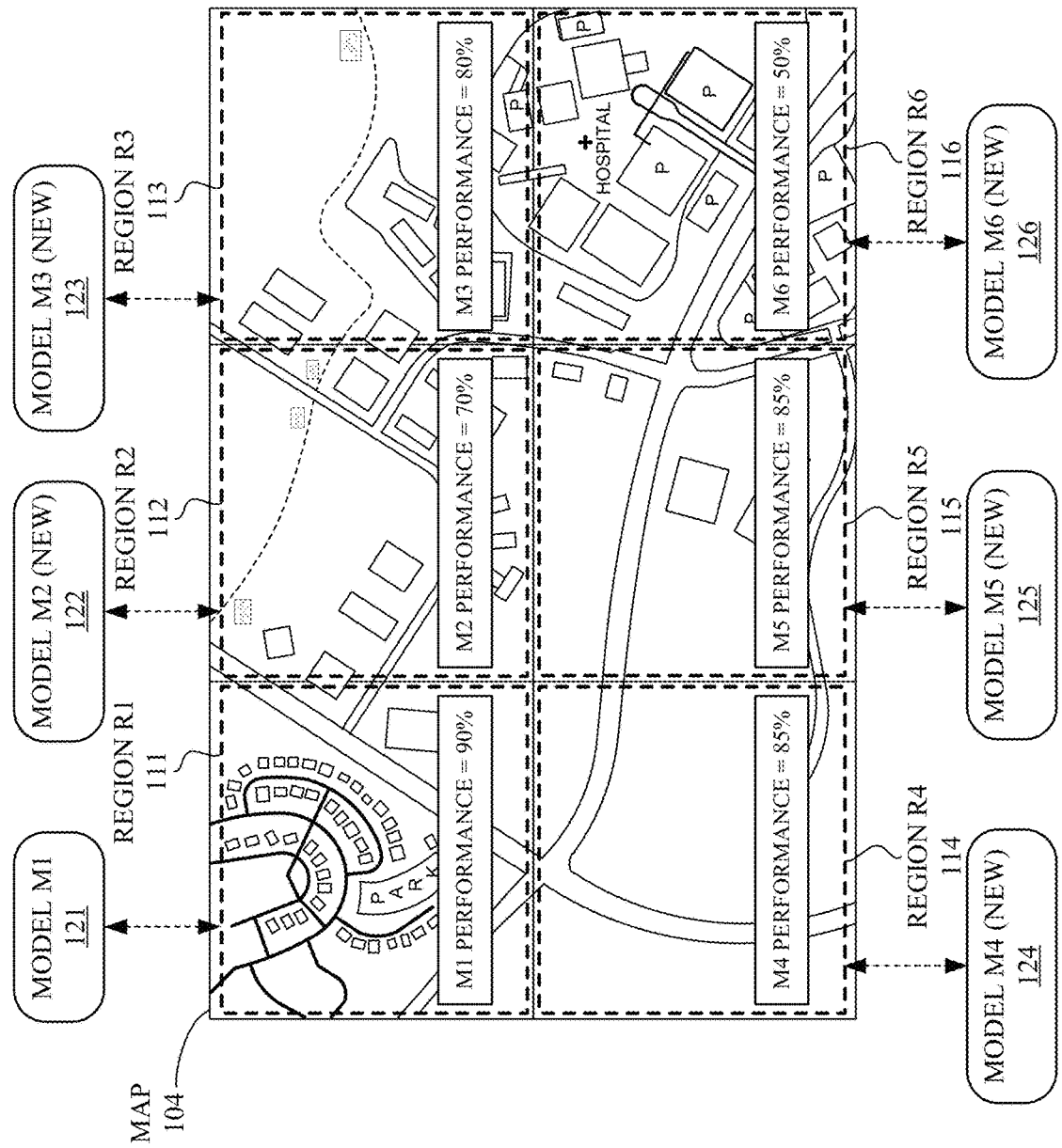
FIG. 1E illustrates an example map divided into regions associated with models and performance assessments.

FIG. 1E illustrates an example map 104 divided into regions 111-116 associated with models 121-126 and performance assessments. According to the performance assessments shown in FIG. 1D, the performance of the generalized model 121 on regions 112-116 is sufficiently poor that the model replacement criteria (performance <80%) is satisfied, and one or more localized models for each or a combination of one or more of the different regions 122-126 may be trained. Thus, in this example, the generalized model 121 is replaced with one or more localized models for regions 122-126. In other examples, the generalized model 121 may be replaced with a single localized model (not shown) for regions 122-126 (in which case regions 122-126 may be represented as a single region instead of five separate regions). If a single localized model is used for a single region at this point in the example, then the single region may subsequently be divided into two or more sub-regions associated with two or more different models if the single region or the sub-regions are identified as satisfying the model replacement criteria.

Further, in the example of FIG. 1E the generalized model 121 remains associated with region 111, in which its performance was 90%. New models 122-126 have been created (e.g., by copying the generalized model 121 or other existing model, or as an untrained model). Each of the new models 122-126 is associated with a respective one of the regions 112-116. Each of the new models 122-126 may be configured in accordance with a corresponding set of model parameters (e.g., weights), which may have been generated in a previous training process. The new models 122-126 may be trained based on training data associated with locations in their respective regions 112-116. This training process may be performed prior to using the models 122-126 to make inferences in vehicle systems. After the training process has been performed, the performance of each of the models 122-126 is assessed using performance measurement techniques such as those described above with reference to FIG. 1D. The resulting performance assessments are 70% for model 122, 80% for model 123, 85% for model 124, 85% for model 125, and 50% for model 126. Thus, model 122 (for region 112) and model 126 for region 116) are still below 80% and satisfy the model replacement criteria. Models 122 and 126 are replaced with new models as shown in FIG. 1F and described below.

Figure 1F:
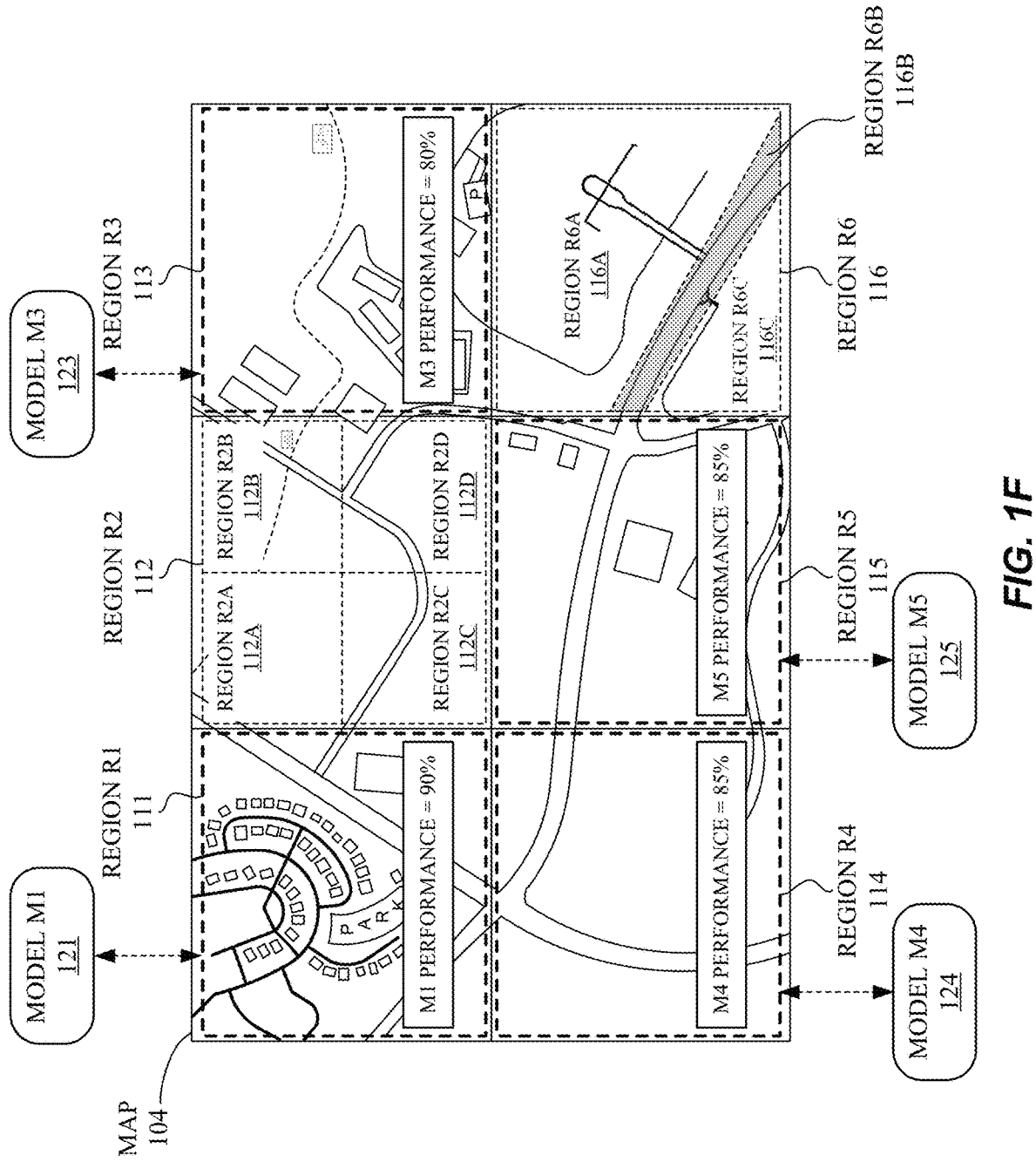
FIG. 1F illustrates an example map divided into regions and smaller sub-regions.

FIG. 1F illustrates an example map 104 divided into regions and smaller sub-regions. According to the performance assessments shown in FIG. 1E, the performance of model 122 on region 112 and the performance of model 126 on region 116 are sufficiently poor that the model replacement criteria (performance <80%) is satisfied, and those models are replaced by dividing their regions (112 and 116) into smaller sub-regions. Region 112 is divided into four sub-equal-sized regions 112A-D in this example. Region 116 is divided into three sub-regions 116A-C in this example. Sub-region 116B is determined based on the location of the road, and conforms to the shape of the road in the region 116. A region division process may have determined that the traffic volume or flow on the road is substantially greater than or different from the traffic flow in other areas of the region 116, so the road was assigned to a separate sub-region 116B from the other portions of the region 116. Areas having different or unique traffic characteristics may be used as regions (or sub-regions) because a region (or sub-region)-specific model may perform better on those areas than a more generalized model such as model 126. Although particular numbers and arrangements of sub-regions are shown and described in this example, any suitable number and/or arrangement of sub-regions may be used. Although region 112 is divided into four equally-size sub-regions in this example, region 112 may be divided into any suitable number of sub-regions of any suitable sizes based on features in the maps or other characteristics (e.g., locations of intersections or other dividing features that may cause regions to be split into sub-regions). Further, although particular regions are divided into particular numbers of sub-regions of particular sizes in the examples described herein, each region may be divided into any suitable number of sub-regions of any suitable sizes based on features in the maps or other characteristics.

Figure 1G:
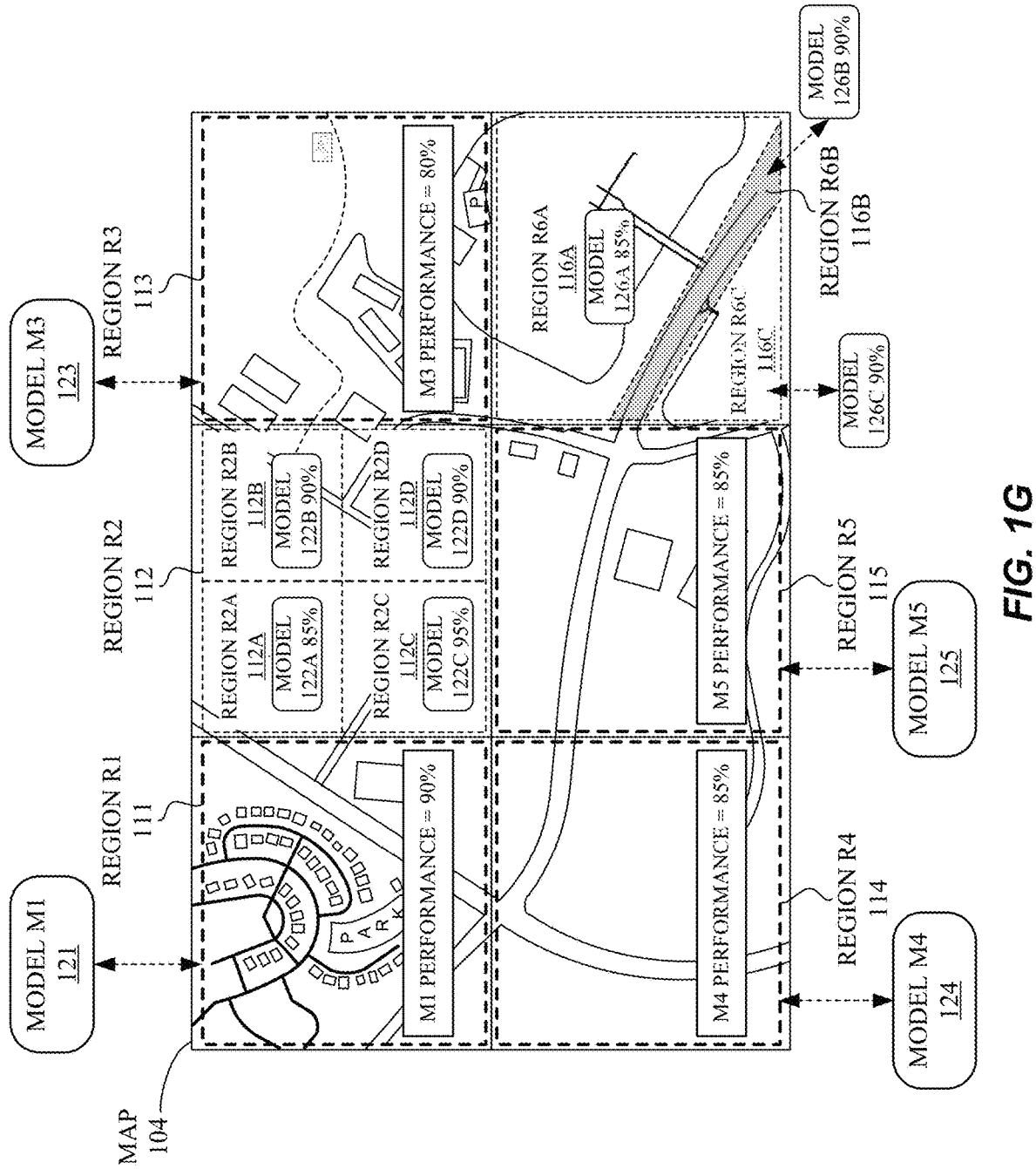
FIG. 1G illustrates an example map divided into regions and smaller sub-regions associated with models and performance assessments.
Figure 1H:
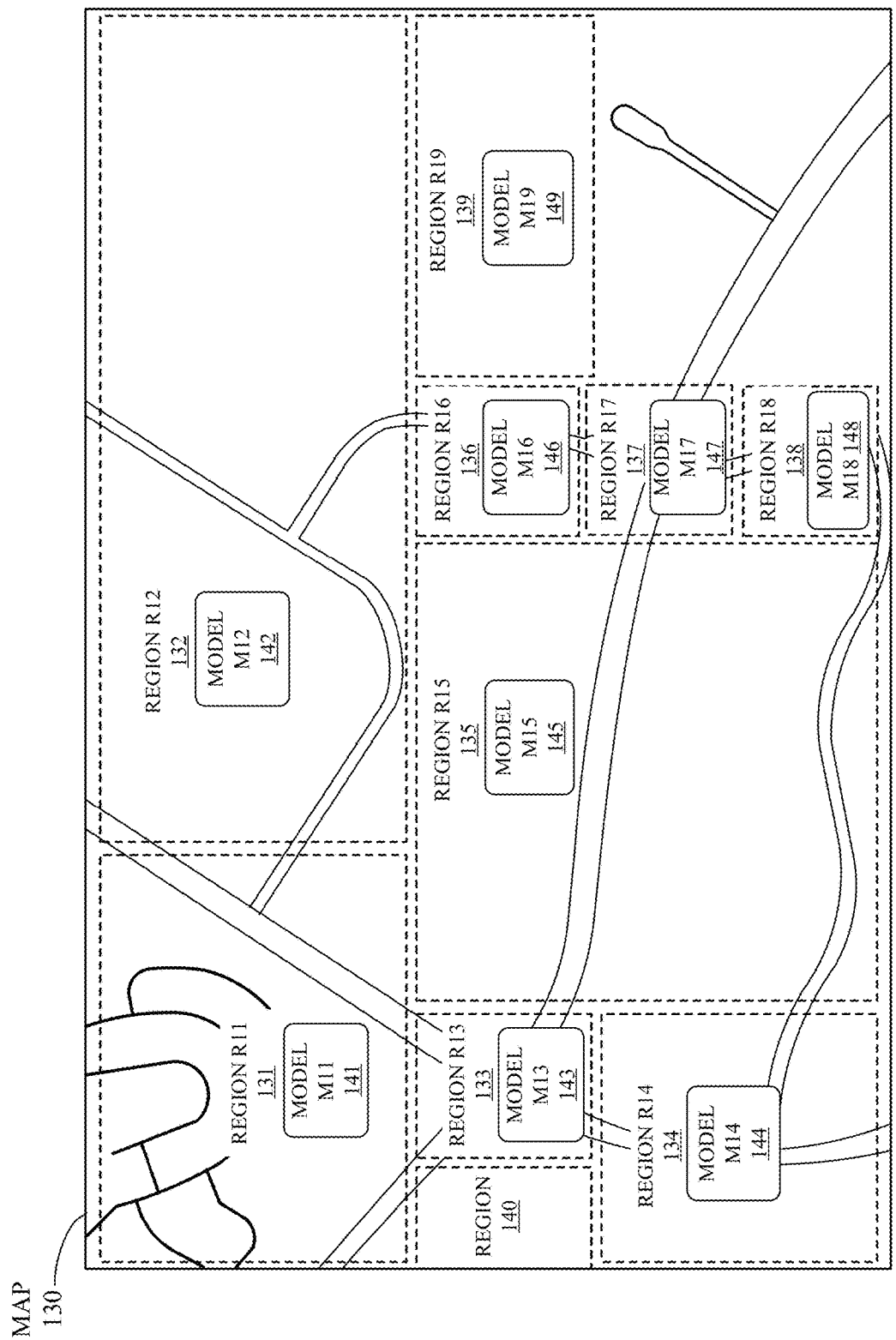
FIG. 1H illustrates an example map divided into regions of varying sizes.

FIG. 1G illustrates an example map 104 divided into regions and smaller sub-regions associated with models and performance assessments. Region-specific models 122A-D have been associated with sub-regions 112A-112D and trained based on data associated with the respective sub-regions 112A-D. Similarly, region-specific models 126A-C have been associated with sub-regions 116A-C and trained based on data associated with the respective sub-regions 116A-C. The performance of these new models has been assessed as described above with reference to FIG. 1D. For sub-regions 122A-D, the resulting performance assessments are 85% for model 122A, 90% for model 122B, 95% for model 122C, and 90% for model 122D. For sub-regions 116A-C, the resulting performance assessments are 85% for model 126A, 90% for model 126B, and 90% for model 126C. Since the performance assessments are above the threshold of 80%, the model replacement criteria is not satisfied for any regions of the map 104, and no further regions or models are created in this example.

FIG. 1I1 illustrates an example map 104 divided into regions 131-139 of varying sizes. Map regions may be of different sizes and/or shapes. The regions 131-139 have been determined based on topology of the map 130 by identifying areas having features, such as road segments or intersections that may be different from other areas, and assigning each potentially different area to a different region. Region 131 includes a residential development area and two road segments that ordinarily have medium levels of traffic flow (e.g., medium number of vehicles per unit of time and/or medium average vehicle speed). Region 132 includes road segments ordinarily having low to medium levels of traffic flow. Region 133 includes an intersection ordinarily having a medium to high levels of straight and turning traffic flow. Region 134 includes an intersection ordinarily having low levels of traffic flow between intersecting road segments. Region 135 includes road segments ordinarily having low levels of traffic flow. Region 136 includes a road segment ordinarily low levels of traffic flow. Region 137 includes an intersection ordinarily having medium to high levels of straight traffic flow and medium levels of turning traffic flow. Region 138 includes a road segment ordinarily having low to medium levels of traffic flow. Region 139 includes a road segment ordinarily having medium to high levels of traffic flow. Each of the regions 131-139 is associated with a corresponding one of the region-specific models 141-149. A region 140 is not associated with a region-specific model, and may be associated with a generalized model (not shown).

Figure 2A:
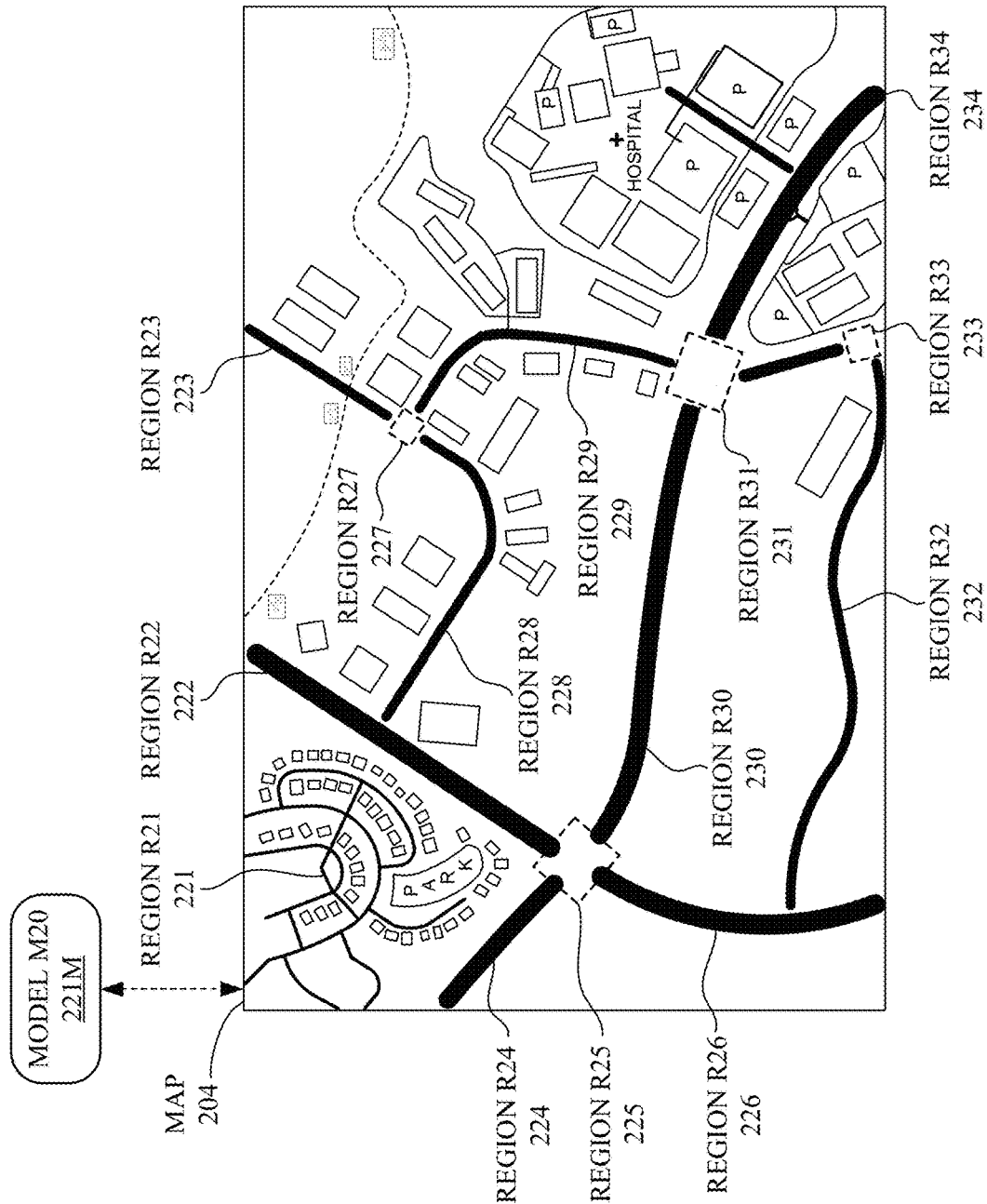
FIG. 2A illustrates an example map associated with a single model and divided into regions that correspond to road segments and intersections.

FIG. 2A illustrates an example map associated with a single model and divided into regions that correspond to road segments and intersections. Regions that represent road segments or intersections are shown in the examples of FIG. 2A-2D. In particular embodiments, regions that represent road segments or intersections may be associated with the road segments or intersections themselves, instead of being associated with a geographical area that includes the road segments or intersections. Alternatively or additionally, regions that represent road segments or intersections may be associated with geographical areas that include the road segments or intersections. The map 204 shows the same geographical area as map 104 of FIG. 1D, but with regions 221-234 that correspond to roads or intersections instead of regions 111-116 that correspond to geographical areas.

Figure 2B:
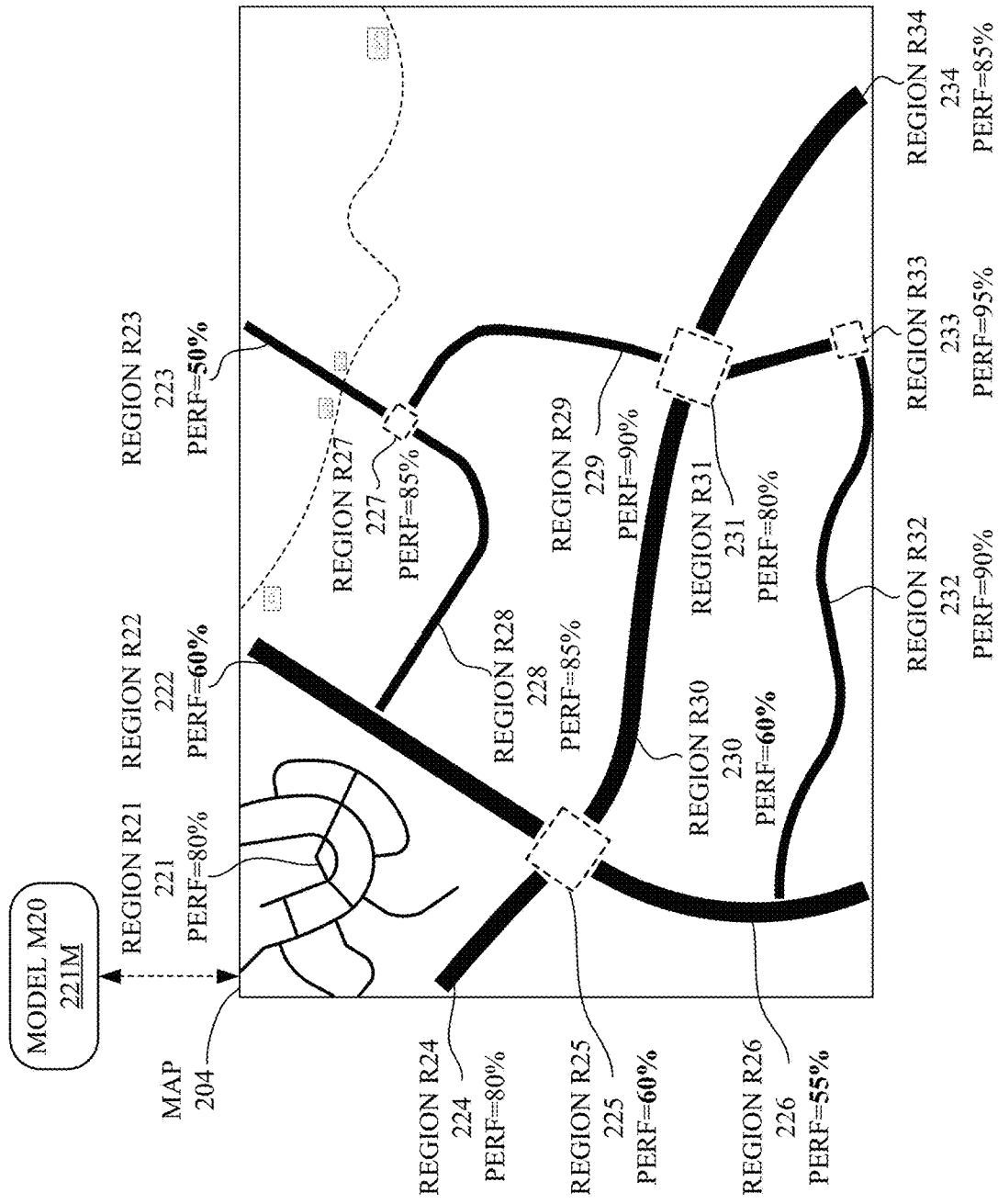
FIG. 2B illustrates an example map associated with a single model and divided into regions that correspond to road segments and intersections having associated performance assessments.

FIG. 2B illustrates an example map 204 associated with a single model 221M and divided into regions 221-234 that correspond to road segments and intersections having associated performance assessments. The performance assessments shown in FIG. 2B are for a generalized model 221M and may be generated as described above with reference to FIG. 1D and include a performance of 80% on region 221, 60% on region 222, 50% on region 223, 80% on region 224, 60% on region 225, 55% on region 226, 85% on region 227, 85% on region 228, 90% on region 229, 60% on region 230, 80% on region 231, 90% on region 232, 95% on region 233, and 85% on region 234. The model replacement criteria (performance <80%) is satisfied for regions 222, 223, 225, 226, and 230, so the general-purpose model 221M will be replaced with region-specific models for those regions, as shown in FIG. 2C and described below.

Figure 2C:
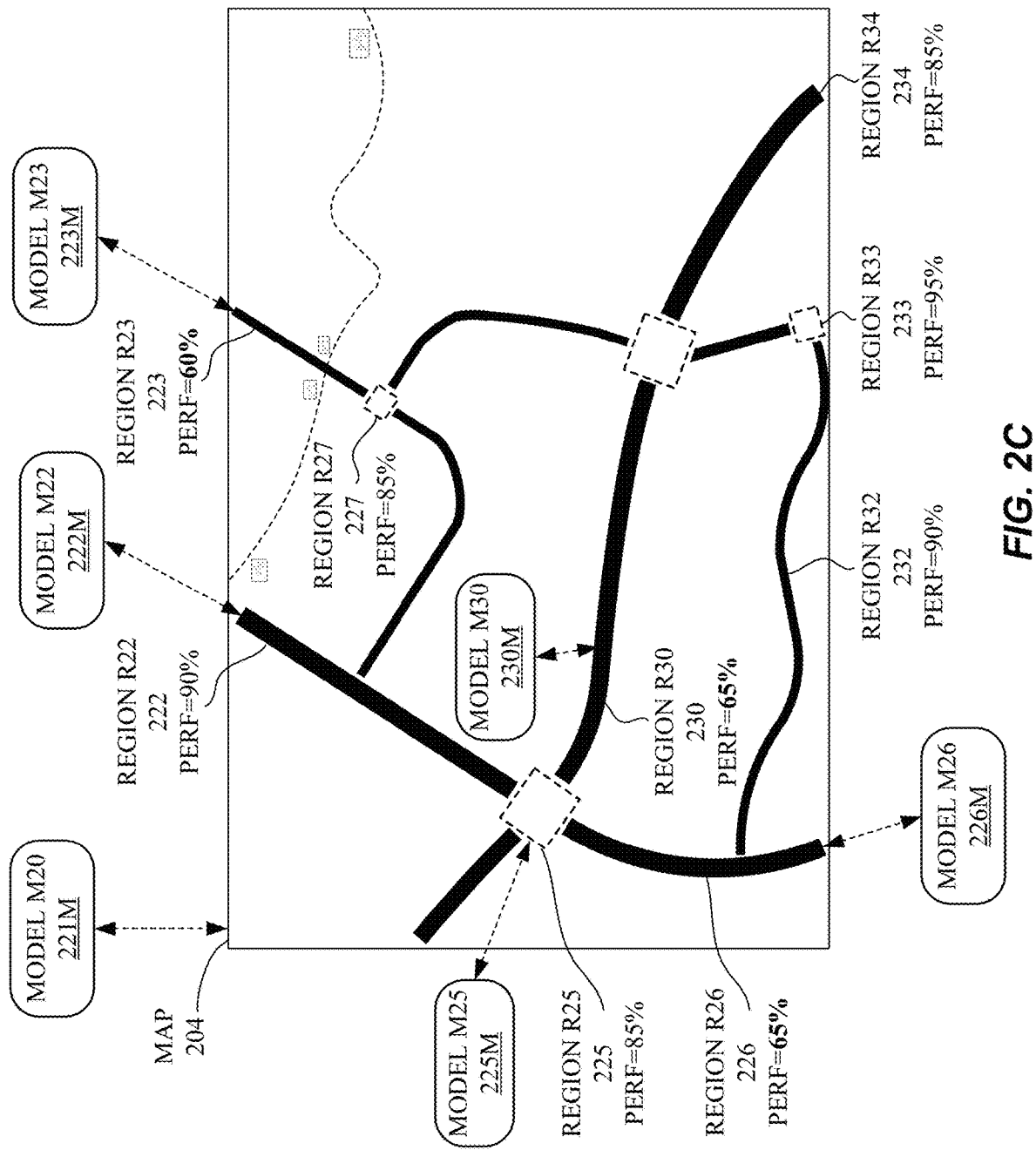
FIG. 2C illustrates an example map divided into regions that correspond to road segments and intersections associated with models and having associated performance assessments.

FIG. 2C illustrates an example map divided into regions that correspond to road segments and intersections associated with models and having associated performance assessments. According to the performance assessments shown in FIG. 2B, the performance of the generalized model 221M on regions 222, 223, 225, 226, and 230 is sufficiently poor that the model replacement criteria (performance <80%) is satisfied, and the generalized model 221M is replaced for those regions. The generalized model 221M remains associated with the other regions of the map 204.

As shown in FIG. 2C, new models 222M, 223M, 225M, 226M, and 230M have been created (e.g., by copying the generalized model 221M or other existing model, or as an untrained model). Each of the new models is associated with a respective one of the regions 222, 223, 225, 226, 230. Each of the new models may be configured in accordance with a corresponding set of model parameters (e.g., weights), which may have been generated in a previous training process. The new models may be trained based on training data associated with locations in their respective regions. This training process may be performed prior to using the models 222M, 223M, 225M, 226M, and 230M to make inferences in vehicle systems. After the training process has been performed, the performance of each of the models 222M, 223M, 225M, 226M, and 230M is assessed using performance measurement techniques such as those described above with reference to FIG. 1D. The resulting performance assessments are 90% for model 222M, 60% for model 223M, 85% for model 225M, 65% for model 226M, and 65% for model 230M. Thus, models 223M, 225M, 226M, and 230M are still below 80% and satisfy the model replacement criteria. These models are replaced with new models as shown in FIG. 2D and described below.

Figure 2D:
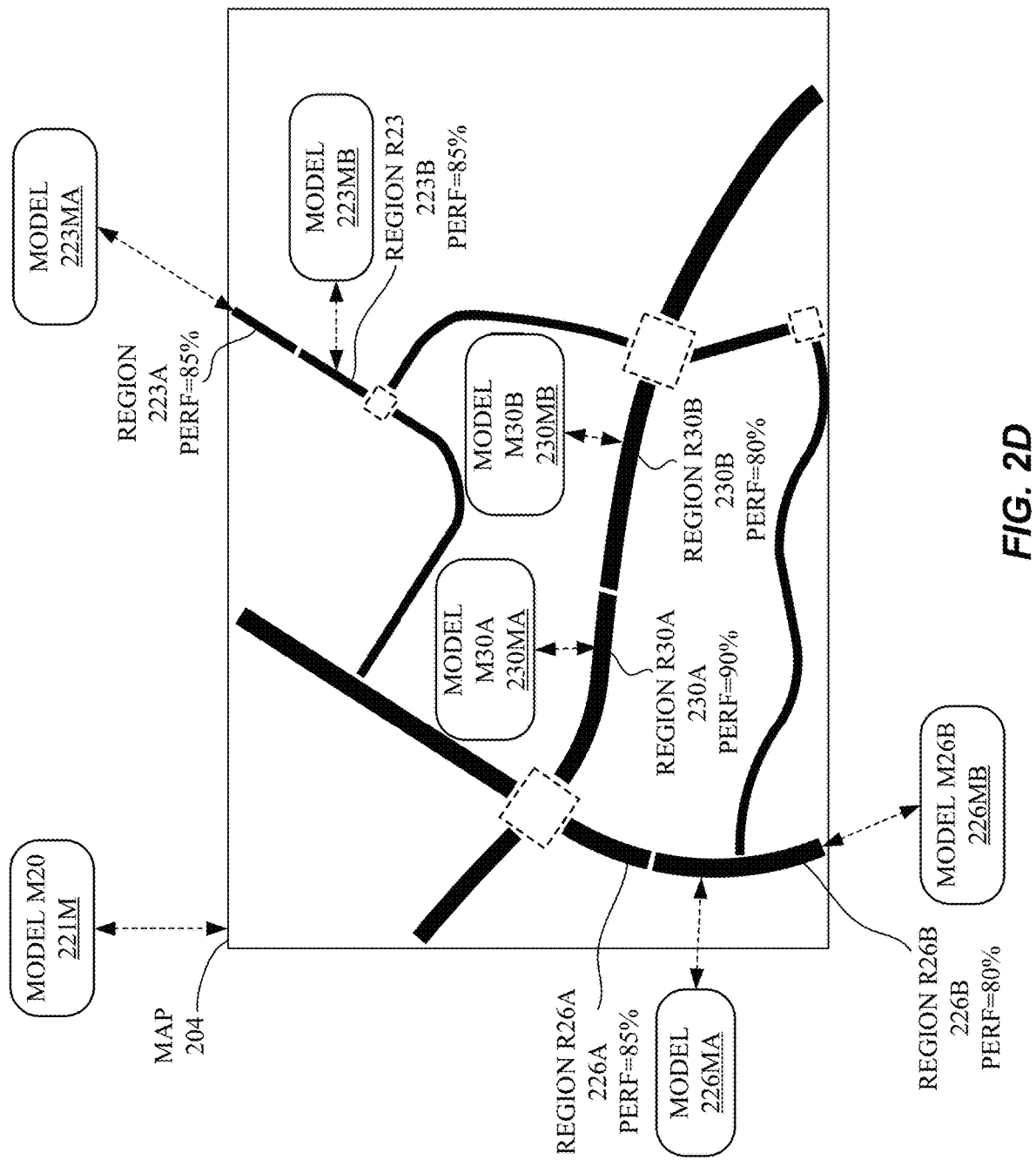
FIG. 2D illustrates an example map divided into regions and smaller sub-regions that correspond to road segments associated with models and having associated performance assessments.

FIG. 2D illustrates an example map 204 divided into regions and smaller sub-regions that correspond to road segments associated with models and having associated performance assessments. According to the performance assessments shown in FIG. 2C, the performances for model 223M on region 223, model 226M on region 226, and model 230M on region 230 are sufficiently poor that the model replacement criteria (performance <80%) is satisfied, and those models are replaced by dividing their regions (223, 226, 230) into smaller sub-regions in this example. Example region 223 is a road segment that intersects a bicycle path. A bicycle path intersecting a road segment is an unusual vehicle environment, so region 223 is divided into two sub-regions 223A and 223B, one of which (223B) includes the bicycle path and the other of which (223A) does not, so that a region-specific model can be trained for each the two different regions 223A, 223B of the road segment 223. Accordingly, region-specific models 223MA and 223MB are created for regions 223A and 223B, respectively.

Example region 226 is divided into two sub-regions 226A, 226B. A region division process may have determined that the traffic volume or flow on the road in sub-region 226A is substantially slower than the traffic flow in region 226B, e.g., because of the upcoming intersection 225 for traffic flowing toward the intersection 225, so the area of the road having slower traffic is assigned to a separate sub-region 226A from area of the road having faster traffic (sub-region 226B). Accordingly, region-specific models 226MA and 226MB are created for regions 226A and 226B, respectively.

Example region 230 is divided into two sub-regions 230A, 230B because topological (e.g., topographical) data indicates that the portion of the region (road) 230 at approximately the mid-point between regions (intersections) 225 and 231 is the crest of a steep hill, and there is little visibility between the two halves of the region (road) 230. Thus, traffic flow is faster on the descending side of the hill crest than on the ascending side. Since the hill crest in the road segment on the ascending side is an unusual topological feature, a sub-region 230B is created for that road-segment. The remaining portion of the region (road) 230 is associated with a new sub-region 230A. Region-specific models 230MA and 230MB are created for regions 230A and 230B, respectively.

The performance of these new models has been assessed as described above with reference to FIG. 1D. For sub-regions 223A and 223B, the resulting performance assessments are 85% for model 223MA, and 85% for model 223MB. For sub-regions 226A and 226B, the resulting performance assessments are 85% for model 226MA and 80% for model 226MB. For sub-regions 230A and 230B, the resulting performance assessments are 90% for model 230MA and 80% for model 230MB. Since the performance assessments are above the threshold of 80%, the model replacement criteria is not satisfied for any regions of the map 204, and no further regions or models are created in this example. Although particular numbers and arrangements of sub-regions are shown and described in this example, any suitable number and/or arrangement of sub-regions may be used.

Figure 3:
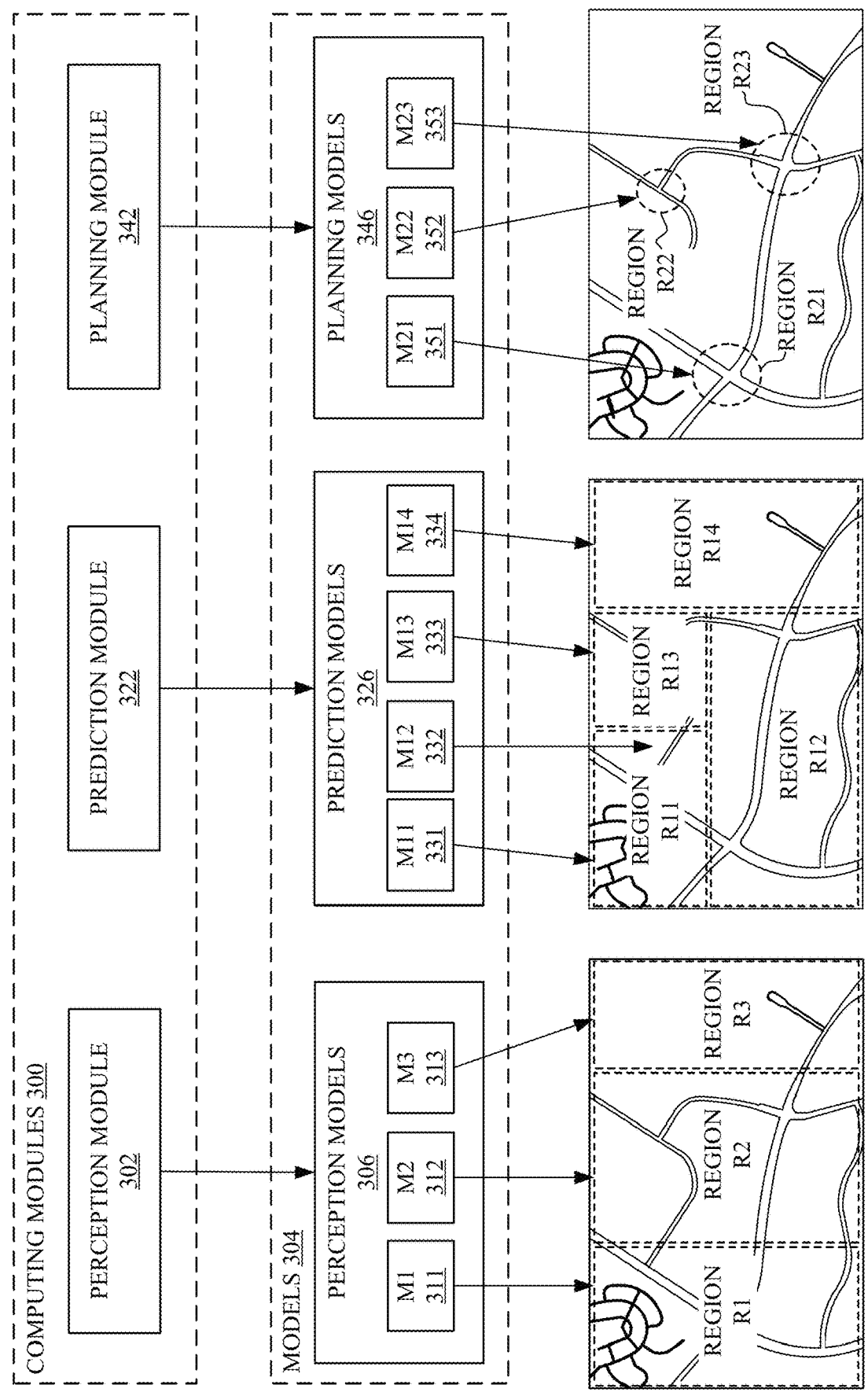
FIG. 3 illustrates example perception, prediction, and planning modules that use models associated with map regions.

FIG. 3 illustrates example perception, prediction, and planning modules 300 that use models 304 associated with map regions. A computing system may include modules 300 for different types of tasks such as perception, prediction, and planning. Different tasks can involve different types of models 304, which can be trained differently, so the process of creating region-specific models 304 can produce different region-specific models for each type of task. The region-specific models can in turn correspond to different map regions. As a result, each of the computing system modules 300 may be associated with a different set of inference models 304.

In particular embodiments, the perception module 302 may be associated with a set of perception models 306, the prediction module 322 may be associated with a set of prediction models 326, and the planning module 342 may be associated with a set of planning models 346. Each different set 306, 326, 346 of inference modules 304 may include one or more region-specific models that are trained to perform type of task associated with the set 306, 326, 346 of inference models 304. As an example, the perception models 306 can include, e.g., three region-specific perception models 311, 312, 313 associated with three corresponding regions R1, R2, R3 of a map. The prediction models 326 can include, e.g., four region-specific prediction models 331, 332, 333, 334 associated with four corresponding regions R11, R12, R13, R14 of the map. The planning models 346 can include, e.g., three region-specific planning models 351, 352, 353 associated with three corresponding regions R21, R22, R23 of the map. These sets of perception models 306, prediction models 326, and planning models 346, and their corresponding map regions, may be generated by a process that identifies map regions to be associated with inference models 304, trains the inference models 304 based on the associated map regions, and, if appropriate (e.g., to improve model performance), splits map regions into multiple sub-regions having different sub-region-specific inference models. In particular embodiments, as a result of using different inference models 304 with each type of computing task module 300, the models 304 for a particular type of computing task modules 300 may use different region-specific models than other types of computing task modules 300. As the map regions may be generated based on the region-specific models 304 (e.g., on the performance of the region-specific models), each type of computing task module 300 may have map regions that are shaped and arranged differently than the map regions for the other types of computing task modules, as can be seen in FIG. 3.

Figure 4:
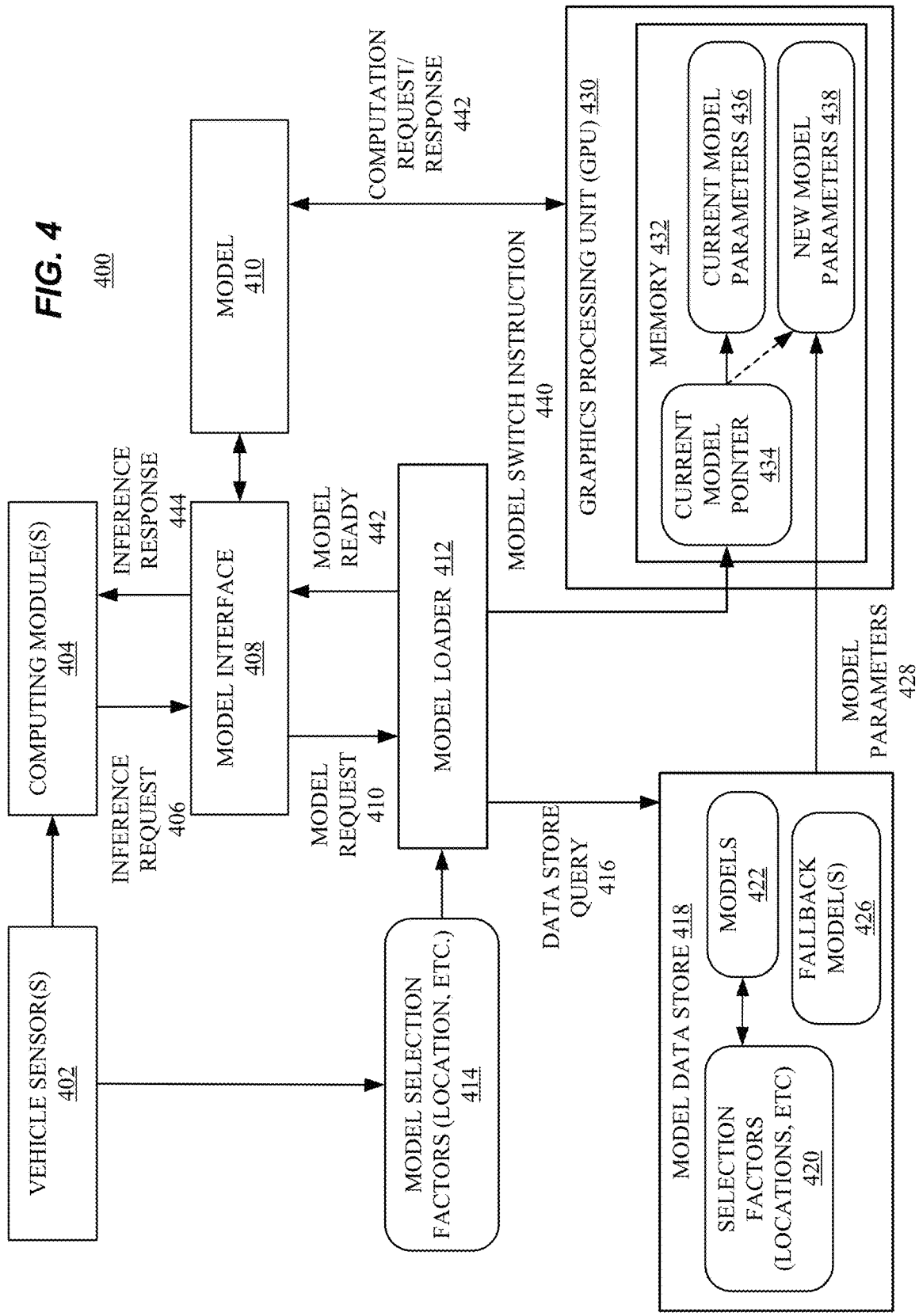
FIG. 4 illustrates an example block diagram of a system for loading and activating geolocalized models.
Figure 5:
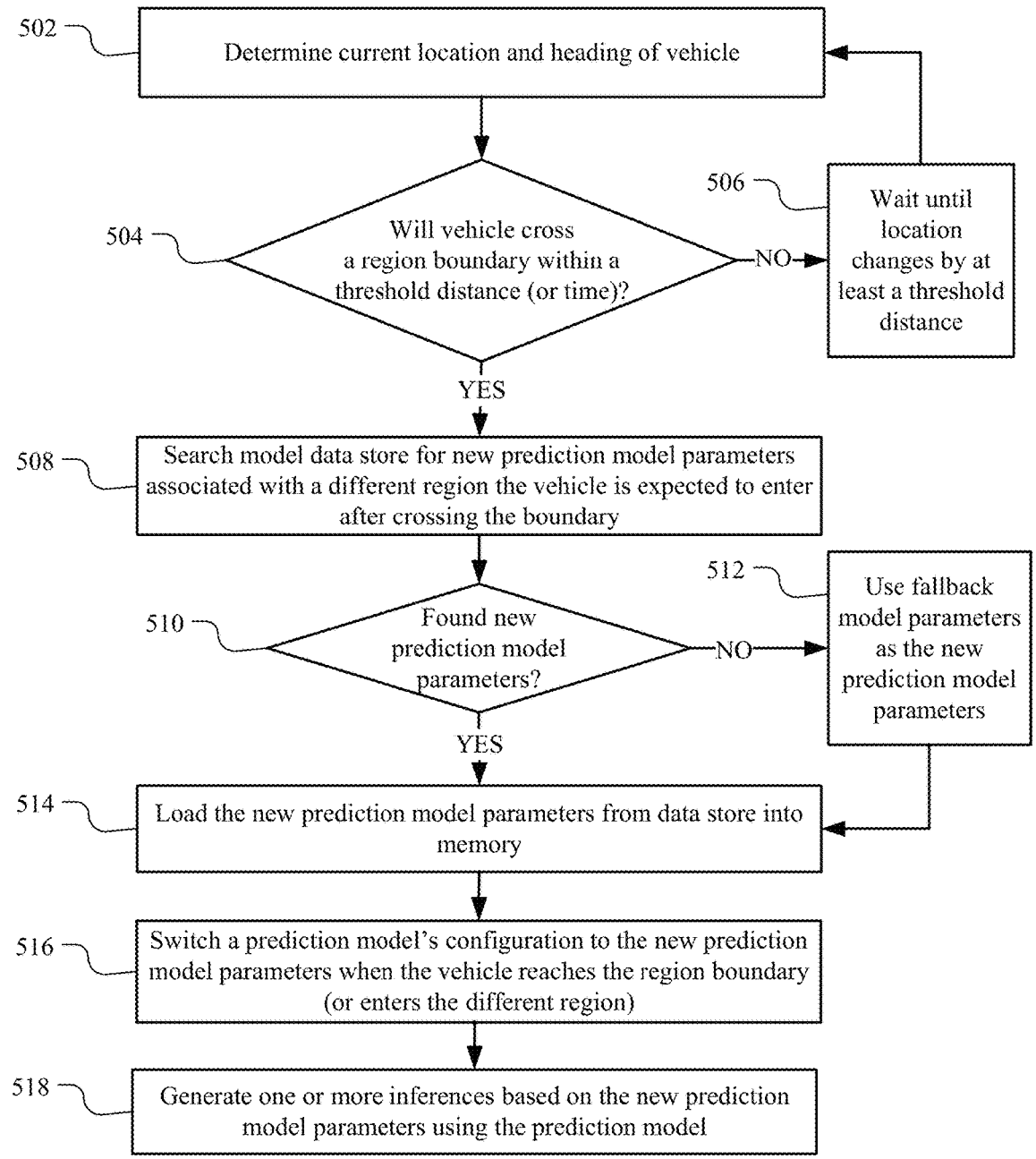
FIG. 5 illustrates an example method for pre-loading prediction model configurations when a vehicle approaches a region boundary configuration and switching to the pre-loaded parameters when the vehicle reaches the boundary.
Figure 6:
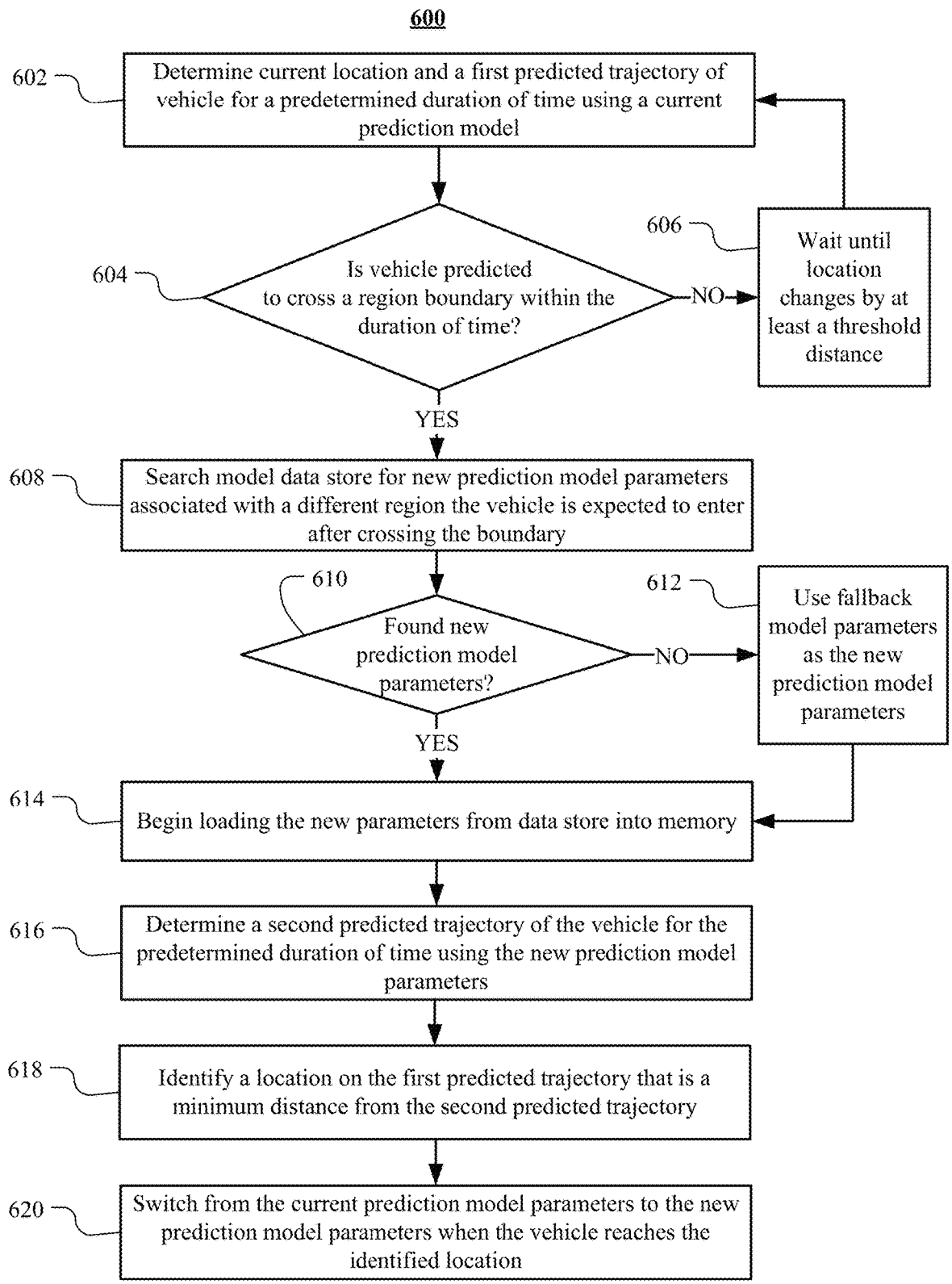
FIG. 6 illustrates an example method for switching between prediction model configurations associated with different map regions at a minimum distance between trajectories predicted using the model configurations.

FIG. 4 illustrates an example block diagram of a system 400 for loading and activating geolocalized models. The system 400 may load and activate a model in response to a request from a module 404 to perform an inference. When the model has been loaded and activated, the system 400 may send inference requests from the computing modules 404 directly to the activate model. Methods for improving the smoothness of model changes are shown in FIGS. 5 and 6. The system 400 may include a model interface 408, which may interact with one or more computing modules 404, such as a sensor data module 402 perception module, a prediction module, a planning module, and a control module. The model interface 408 provides an interface between computing modules 404 and region-specific models. In response to receiving a request for an inference 406 from one or more of the computing modules 404 (e.g., a request for a prediction from the prediction module), the model interface 408 may send a model request 410 to a model switcher 412 for a model of the type that corresponds to the computing module 404 that submitted the request for inference 406. For example, if the prediction module submitted the request for inference 406, then the model interface may send a model request 410 for a prediction model.

The model switcher 412 may receive the model request 410 and, in response, identify one or more model selection factors 414, such as a current vehicle location, current time of day, current lighting conditions, current weather conditions, and so on, from the vehicle sensors 402 or other data sources (e.g., a map database, a weather service, a vehicle system clock, and so on). The model switcher 412 may generate a data store query 416 based on the requested type of model and the model selection factors 414 (e.g., the current vehicle location). The model data store 418 may identify an entry in the data store 418 having model selection factors (e.g., location) 420 that match those in the data store query 416. If a match between the query 416 and the stored selection factors 420 is found, then a model 422, which may be represented as model parameters (such as weights), associated with the matching selection factors may be retrieved, the retrieved model parameters 428 may be sent to a GPU 430.

In particular embodiments, the model parameters 428 may be loaded into a memory 432 of a Graphics Processing Unit (GPU) 430. Loading the model parameters 428 may involve retrieving the model parameters 428 from the model data store 418 as described above. The model data store 418 may be stored locally, e.g., on a local storage device of the vehicle system, and/or remotely, e.g., in a cloud storage device accessible via network communication. Thus, there may be delay while the model parameters 428 are retrieved and loaded into the memory 432. In particular embodiments, the model parameters 438 may be pre-loaded (e.g., pre-cached), e.g., by loading model parameters 438 for regions prior to entering the regions. For example, the model parameters for a region may be pre-loaded when the vehicle is heading toward the region and within a threshold distance of the region, or is predicted to arrive at the region within a threshold time, or when the vehicle is in an overlapping boundary of the region prior to entering the region.

In particular embodiments, when the new model parameters 438 have been loaded, the model loader 412 may send a model switch instruction 440 to the GPU 430 or other component that interacts with the GPU 430 to cause the new model parameters 438 to be swapped with current model parameters 436. The model switch instruction 440 may cause a current model pointer 434 to refer to the new model parameters 438 instead of the current model parameters 436. Changing the pointer 434 or performing similar instructions to switch to the new model parameters, subsequent inference requests sent to a model 410 may use the new model parameters 438 instead of the current model parameters 436. After sending the model switch instruction 440, the model loader 412 may send a model ready response 442 to the model interface 408. The model interface 408 may forward the inference request 406 to the model 410, and the model 410 may perform the requested inference by interacting with the GPU 430 via a computation request/response 442. The GPU 430 may perform the inference by executing computations using the new model parameters 438 and generating computation results. The model 410 may receive computation results from the GPU 430 and generate an inference result, which may be based on or include the computation results. The model 410 may send the inference result to the model interface 408, which may forward the inference as an inference response 444 to the computing modules 444.

In particular embodiments, if the new model parameters 438 for a region have been pre-loaded, then the system 400 may switch to the new model parameters 438 when the vehicle enters the region (e.g., crosses the boundary of the region). To switch to the new model parameters 438, the system 400 (e.g., the model loader 412 or other component of the system 412 invoked at other times subsequent to loading of the model parameters 438) may change the current model pointer 434 to reference the new model parameters 438 instead of the current model parameters 436. Thus, switching the configurations of the model 410 from the current model parameters 436 to the new model parameters 438 may be performed by updating a reference (e.g., the model pointer 434) associated with the configuration of the model 410 to refer to the new model parameters 438 in the memory 432.

FIG. 5 illustrates an example method for pre-loading prediction model configurations when a vehicle approaches a region boundary configuration and switching to the pre-loaded parameters when the vehicle reaches the boundary. The method 500 may begin at step 502, where a vehicle system may determine a current location and heading of a vehicle. At step 504, the vehicle system may determine whether the vehicle will cross a region boundary within a threshold distance (or time). If so, at step 508, the vehicle system may search a model data store for new prediction model parameters associated with a different region that the vehicle is expected to enter after crossing the region boundary. If not, at step 506, the vehicle system may wait until the vehicle's location changes by at least a threshold distance, then invoke step 502 again.

Continuing from step 508, at step 510, the vehicle system may determine whether the search in step 508 found the new prediction model parameters associated with the different region. If not, at step 512, the vehicle system may use fallback model parameters as the new prediction model parameters. The fallback model parameters may be, e.g., parameters of a generalized model that is associated with the different region or with a map that includes the different region. Otherwise, at step 514, the vehicle system may load the new prediction model parameters from data store into memory, e.g., into a memory of a GPU. At step 516, the vehicle system may switch a prediction model's configuration to the new prediction model parameters when the vehicle reaches the region boundary or enters the different region. At step 518, the vehicle system may generate one or more inferences based on the new prediction model parameters using the prediction model.

FIG. 6 illustrates an example method 600 for switching between prediction model configurations associated with different map regions at a minimum distance between trajectories predicted using the model configurations. As an example of smoothing the transition between regions, when the vehicle is in a first region, heading toward a second region, and within a threshold distance of the second region, first and second prediction models associated with the first and second regions, respectively, may be used to generate first and second predicted trajectories for the vehicle. The trajectories may be compared to identify a minimum distance between them. The minimum distance may correspond to, e.g., a point of greatest agreement between the trajectories. The switch between models may then be made at a location that corresponds to the location of the minimum distance. The method may begin at step 602, where a vehicle system may determine current location and a first predicted trajectory of vehicle for a predetermined duration of time using a current prediction model. The predetermined duration of time may be a duration of time that begins at the current time or in the future. At step 604, the vehicle system may determine, based on the first predicted trajectory, whether the vehicle is predicted to cross a region boundary within the duration of time. If not, at step 606 the vehicle system may wait until the vehicle's location changes by at least a threshold distance and invoke step 602 again. At step 608, the vehicle system may search a model data store for new prediction model parameters associated with a different region the vehicle is expected to enter after crossing the boundary. At step 610, the vehicle system may determine whether the new prediction model parameters associated with the different region were found. If not, at step 612, the vehicle system may use fallback model parameters as the new prediction model parameters. The fallback model parameters may be, e.g., parameters of a generalized model that is associated with the different region or with a map that includes the different region.

At step 614, the vehicle system may begin loading the new parameters from data store into memory, e.g., a memory of a GPU. At step 616, the vehicle system may determine a second predicted trajectory of the vehicle for the predetermined duration of time using the new prediction model parameters. At step 618, the vehicle system may identify a location on the first predicted trajectory that is a minimum distance from the second predicted trajectory. At step 620, by which point the new parameters have been loaded into the memory, the vehicle system may switch from the current prediction model parameters to the new prediction model parameters when the vehicle reaches the identified location, e.g., by instructing the GPU to use the new prediction model parameters.

Figure 7:
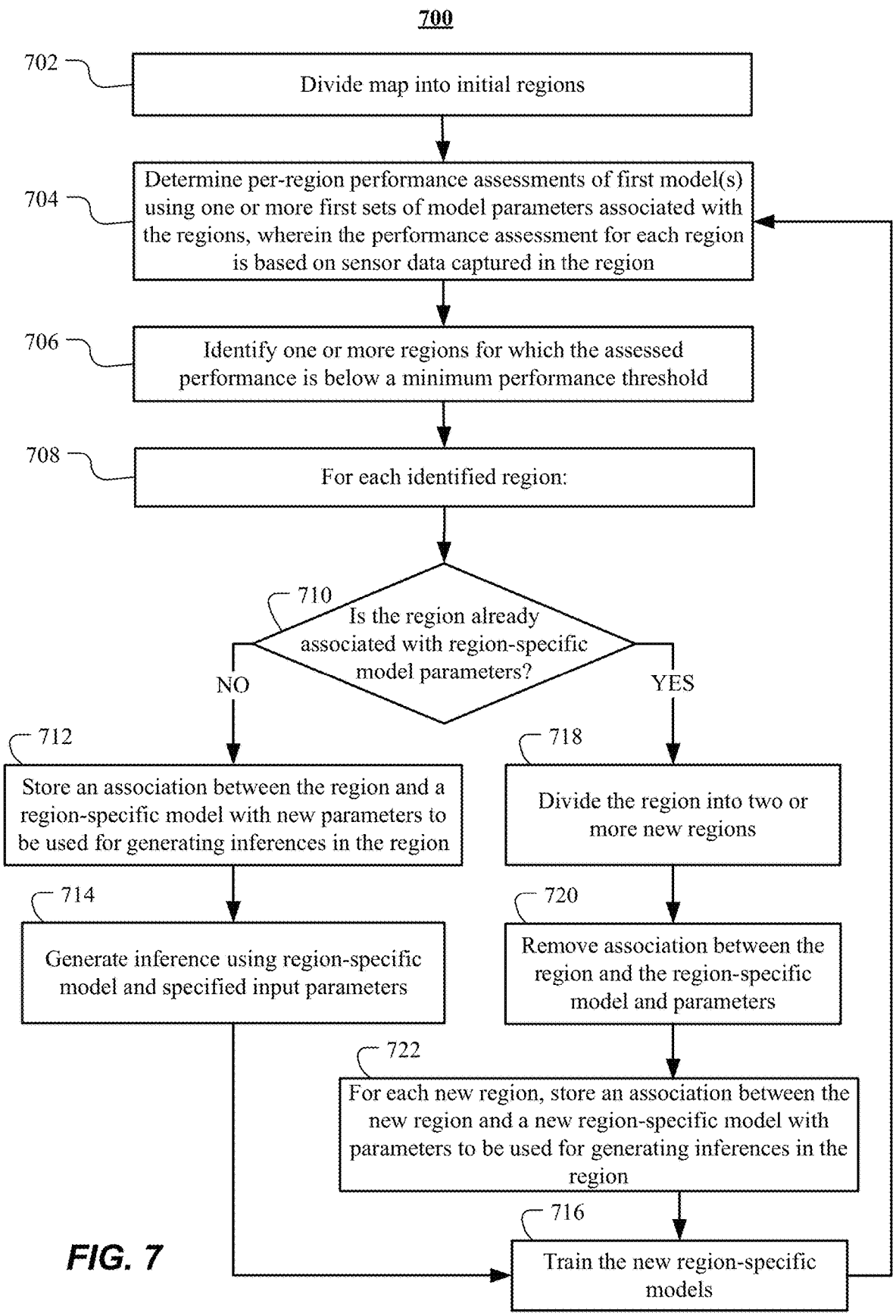
FIG. 7 illustrates an example method for associating region-specific sets of model parameters with map regions based on model performance.

FIG. 7 illustrates an example method 700 for associating region-specific sets of model parameters with map regions based on model performance. In particular embodiments, region-specific models may be associated with regions based on the performance of other models associated with larger enclosing regions. When the performance of a model associated with a larger region is below a performance threshold (and, optionally, the size of the region (e.g., area in square units) is above a size threshold, then the larger region may be divided into two or more sub-regions, and new region-specific models may be associated with and trained for each new sub-region. The sub-regions may be equal-size sub-regions, or may have sizes or shapes based on topological features of the map, or based on other features such as traffic flow. Thus, for example, when a region's performance is below the performance threshold, and the region includes a road and a parking lot, the region may be divided into two sub-regions: one for the road (and having a shape that conforms to the road) and the other for the remaining portion of the region (which includes the parking lot). Each sub-region may be associated with a corresponding model, and each model may be trained based on training data associated with the corresponding sub-region.

The method 700 may begin at step 702, where a vehicle system may divide geographical map into initial regions. For example, the regions may be identified as described above with reference to FIG. 1B. At step 704, the vehicle system may determine per-region performance assessments of first model(s) using one or more first sets of model parameters associated with the regions, wherein the performance assessment for each region is based on sensor data captured in the region. At step 706, the vehicle system may identify one or more regions for which the assessed performance is below a minimum performance threshold. At step 708, the vehicle system may begin a loop that executes step 710 (and the following steps) for each identified region. At step 710, the vehicle system may determine whether the region is already associated with region-specific model parameters. If not, at step 712 the vehicle system may store an association between the region and a region-specific model with new parameters to be used for generating inferences in the region. At step 714 the vehicle system may generate an inference using region-specific model and specified input parameters. At step 716, the vehicle system may train the new region-specific models based on training data associated with the regions of the corresponding new region-specific models, e.g., sensor data received by a vehicle when the vehicle was in the corresponding regions. Step 716 may invoke step 704 to repeat the portion of the method that identifies regions and associates models and/or model parameters with the regions.

Referring again to the result of step 710, if the vehicle system determines that the region is already associated with region-specific model parameters, at step 718 the vehicle system may divide the region into two or more new regions. At step 720, the vehicle system may remove association between the region and the region-specific model and parameters. At step 722, the vehicle system may, for each new region, store an association between the new region and a new region-specific model with parameters to be used for generating inferences in the region. At step 716, the vehicle system may train the new region-specific models as described above and invoke step 704 to repeat the portion of the method that starts at step 704. In particular embodiments, the method may stop repeating based on a condition evaluated at one or more of the steps. For example, step 706 may determine whether each of the identified regions is smaller than a threshold size (in units of area). If so, step 706 may end the process 700. As another example, step 704 may determine whether the per-region performance assessments have been re-evaluated for the same regions and have not decreased. If none of the performance assessments have decreased, or none have decreased by more than a threshold amount, then step 704 may end the process 700.

Figure 8:
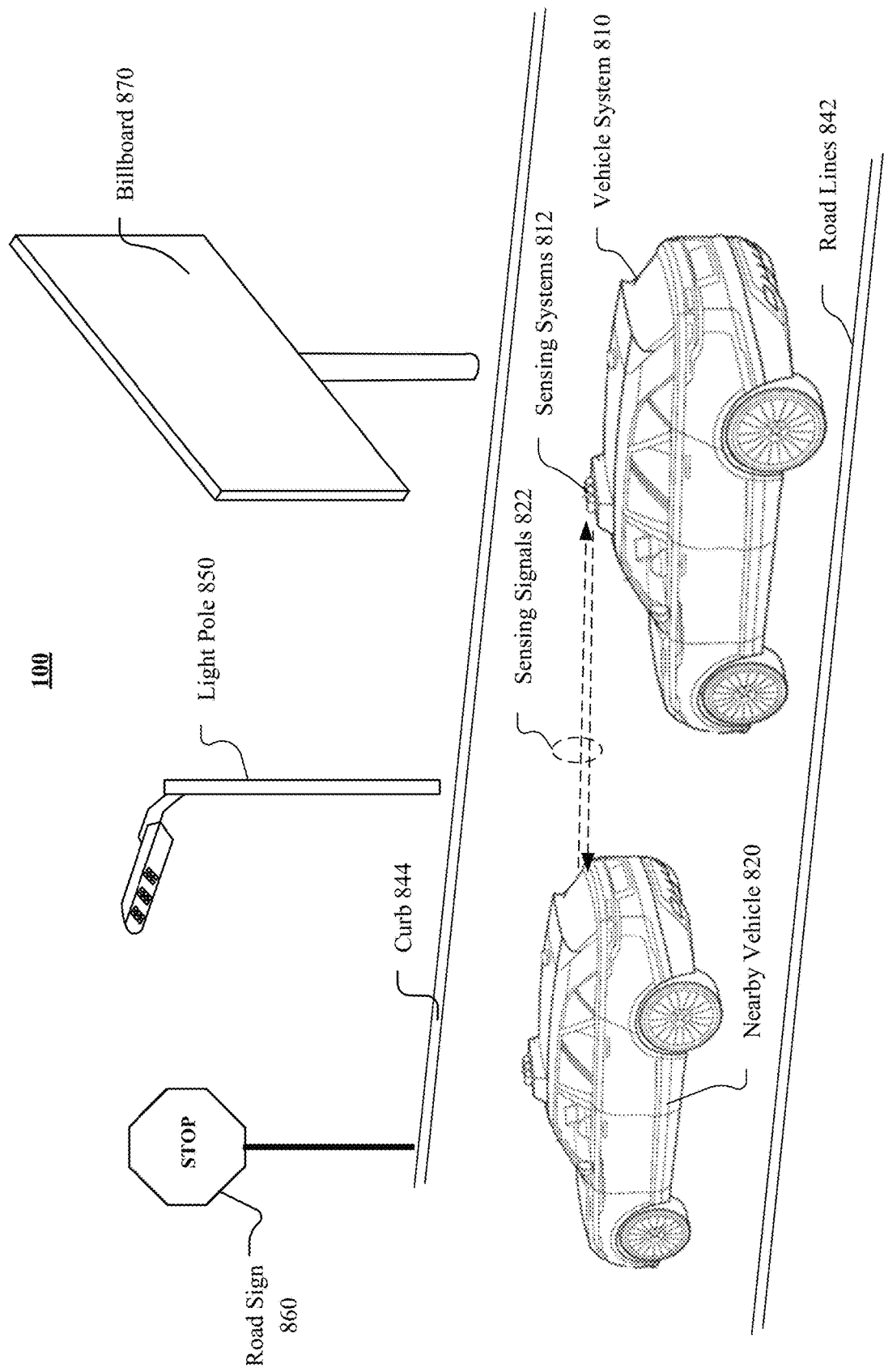
FIG. 8 illustrates an example situation for a data-gathering vehicle system to collect vehicle data of a nearby vehicle and contextual data of the surrounding environment.

FIG. 8 illustrates an example situation 800 for a data-gathering vehicle system 810 to collect vehicle data of a nearby vehicle 820 and contextual data of the surrounding environment. In particular embodiments, the vehicle system 810 (e.g., autonomous vehicles, manually-driven vehicles, computer-assisted-driven vehicles, human-machine hybrid-driven vehicles, etc.) may have a number of sensors or sensing systems 812 for monitoring the vehicle status, other vehicles and the surrounding environment. The sensors or sensing systems 812 may include, for example, but are not limited to, cameras (e.g., optical camera, thermal cameras), LiDARs, radars, speed sensors, steering angle sensors, braking pressure sensors, a GPS, inertial measurement units (IMUs), acceleration sensors, etc. The vehicle system 810 may include one or more computing systems (e.g., a data collection device, a mobile phone, a tablet, a mobile computer, an on-board computer, a high-performance computer) to collect data about the vehicle, the nearby vehicles, the surrounding environment, etc. In particular embodiments, the vehicle system 810 may collect data of the vehicle itself related to, for example, but not limited to, vehicle speeds, moving directions, wheel directions, steering angles, steering force on the steering wheel, pressure of braking pedal, pressure of acceleration pedal, acceleration (e.g., based on IMU outputs), rotation rates (e.g., based on IMU/gyroscope outputs), vehicle moving paths, vehicle trajectories, locations (e.g., GPS coordination), signal status (e.g., on-off states of turning signals, braking signals, emergence signals), human driver eye movement, head movement, etc.

In particular embodiments, the vehicle system 810 may use one or more sensing signals 822 of the sensing system 812 to collect data of the nearby vehicle 820. For example, the vehicle system 810 may collect the vehicle data and driving behavior data related to, for example, but not limited to, vehicle images, vehicle speeds, acceleration, vehicle moving paths, vehicle driving trajectories, locations, turning signal status (e.g., on-off state of turning signals), braking signal status, a distance to another vehicle, a relative speed to another vehicle, a distance to a pedestrian, a relative speed to a pedestrian, a distance to a traffic signal, a distance to an intersection, a distance to a road sign, a distance to curb, a relative position to a road line, an object in a field of view of the vehicle, positions of other traffic agents, aggressiveness metrics of other vehicles, etc. In addition, the sensing system 812 may be used to identify the nearby vehicle 820, which could be based on an anonymous vehicle identifier based on the license plate number, a QR code, or any other suitable identifier that uniquely identifies the nearby vehicle.

In particular embodiments, the vehicle system 810 may collect contextual data of the surrounding environment based on one or more sensors associated with the vehicle system 810. In particular embodiments, the vehicle system 810 may collect data related to road conditions or one or more objects of the surrounding environment, for example, but not limited to, road layout, pedestrians, other vehicles (e.g., 820), traffic status (e.g., number of nearby vehicles, number of pedestrians, traffic signals), time of day (e.g., morning rush hours, evening rush hours, non-busy hours), type of traffic (e.g., high speed moving traffic, accident events, slow moving traffic), locations (e.g., GPS coordination), road conditions (e.g., constructing zones, school zones, wet surfaces, ice surfaces), intersections, road signs (e.g., stop sign 860, road lines 842, cross walk), nearby objects (e.g., curb 844, light poles 850, billboard 870), buildings, weather conditions (e.g., raining, fog, sunny, hot weather, cold weather), or any objects or agents in the surrounding environment. In particular embodiments, the contextual data of the vehicle may include navigation data of the vehicle, for example, a navigation map, a navigating target place, a route, an estimated time of arriving, a detour, etc. In particular embodiments, the contextual data of the vehicle may include camera-based localization data including, for example, but not limited to, a point cloud, a depth of view, a two-dimensional profile of environment, a three-dimensional profile of environment, stereo images of a scene, a relative position (e.g., a distance, an angle) to an environmental object, a relative position (e.g., a distance, an angle) to road lines, a relative position in the current environment, a traffic status (e.g., high traffic, low traffic), driving trajectories of other vehicles, motions of other traffic agents, speeds of other traffic agents, moving directions of other traffic agents, signal statuses of other vehicles, etc. In particular embodiments, the vehicle system 810 may have a perception of the surrounding environment based on the contextual data collected through one or more sensors in real-time and/or based on historical contextual data stored in a vehicle model database.

Figure 9:
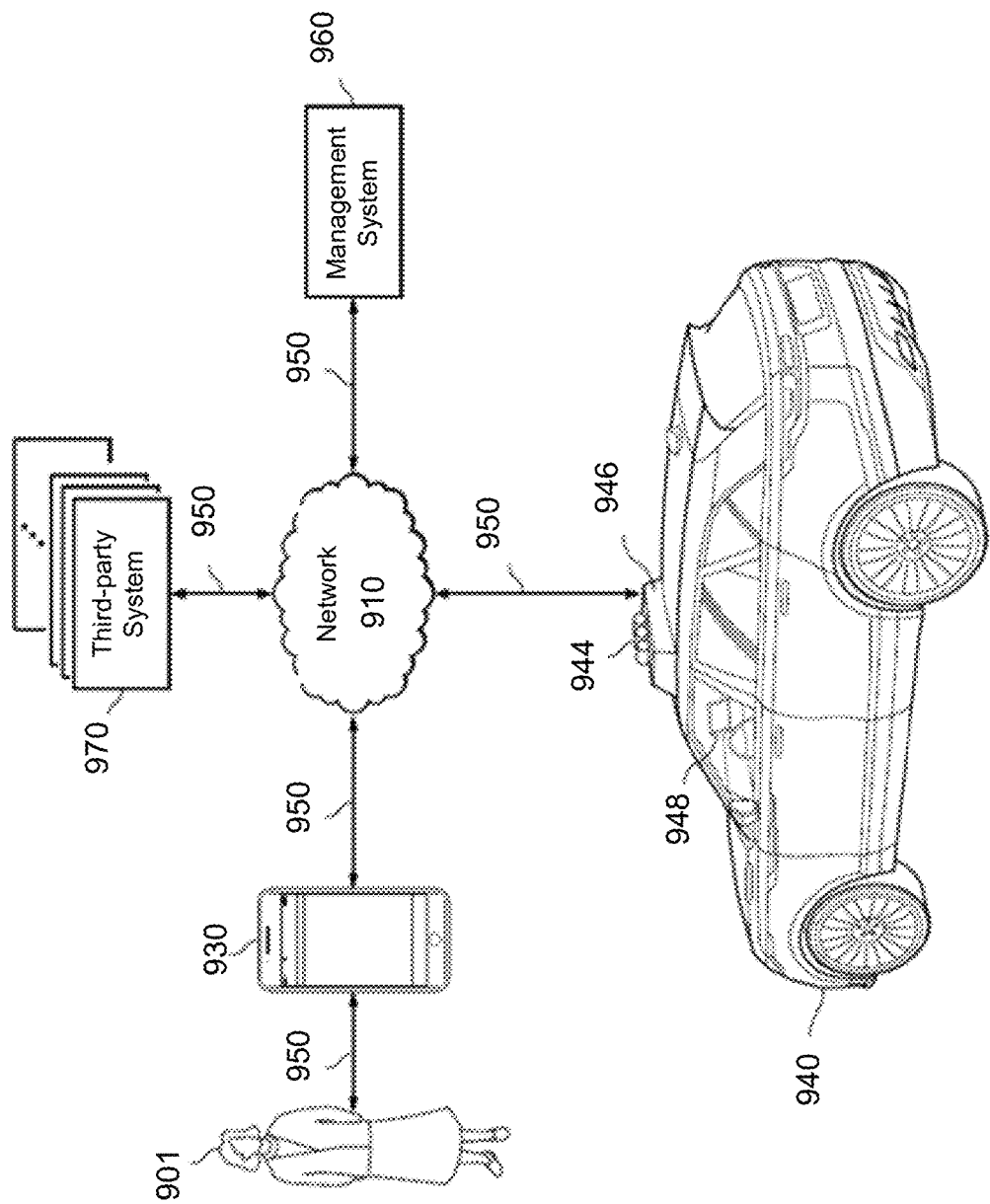
FIG. 9 illustrates an example block diagram of a transportation management environment for matching ride requestors with autonomous vehicles.

FIG. 9 illustrates an example block diagram of a transportation management environment for matching ride requestors with autonomous vehicles. In particular embodiments, the environment may include various computing entities, such as a user computing device 930 of a user 901 (e.g., a ride provider or requestor), a transportation management system 960, an autonomous vehicle 940, and one or more third-party system 970. The computing entities may be communicatively connected over any suitable network 910. As an example and not by way of limitation, one or more portions of network 910 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 9 illustrates a single user device 930, a single transportation management system 960, a single vehicle 940, a plurality of third-party systems 970, and a single network 910, this disclosure contemplates any suitable number of each of these entities. As an example and not by way of limitation, the network environment may include multiple users 901, user devices 930, transportation management systems 960, autonomous-vehicles 940, third-party systems 970, and networks 910.

The user device 930, transportation management system 960, autonomous vehicle 940, and third-party system 970 may be communicatively connected or co-located with each other in whole or in part. These computing entities may communicate via different transmission technologies and network types. For example, the user device 930 and the vehicle 940 may communicate with each other via a cable or short-range wireless communication (e.g., Bluetooth, NFC, WI-FI, etc.), and together they may be connected to the Internet via a cellular network that is accessible to either one of the devices (e.g., the user device 930 may be a smartphone with LTE connection). The transportation management system 960 and third-party system 970, on the other hand, may be connected to the Internet via their respective LAN/WLAN networks and Internet Service Providers (ISP). FIG. 9 illustrates transmission links 950 that connect user device 930, autonomous vehicle 940, transportation management system 960, and third-party system 970 to communication network 910. This disclosure contemplates any suitable transmission links 950, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 950 may connect to one or more networks 910, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 950. For example, the user device 930 may communicate with the transportation management system via a cellular network and the Internet, but communicate with the autonomous vehicle 940 via Bluetooth or a physical wire connection.

In particular embodiments, the transportation management system 960 may fulfill ride requests for one or more users 901 by dispatching suitable vehicles. The transportation management system 960 may receive any number of ride requests from any number of ride requestors 901. In particular embodiments, a ride request from a ride requestor 901 may include an identifier that identifies the ride requestor in the system 960. The transportation management system 960 may use the identifier to access and store the ride requestor's 901 information, in accordance with the requestor's 901 privacy settings. The ride requestor's 901 information may be stored in one or more data stores (e.g., a relational database system) associated with and accessible to the transportation management system 960. In particular embodiments, ride requestor information may include profile information about a particular ride requestor 901. In particular embodiments, the ride requestor 901 may be associated with one or more categories or types, through which the ride requestor 901 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 960 may classify a user 901 based on known information about the user 901 (e.g., using machine-learning classifiers), and use the classification to retrieve relevant aggregate information associated with that class. For example, the system 960 may classify a user 901 as a young adult and retrieve relevant aggregate information associated with young adults, such as the type of music generally preferred by young adults.

Transportation management system 960 may also store and access ride information. Ride information may include locations related to the ride, traffic data, route options, optimal pick-up or drop-off locations for the ride, or any other suitable information associated with a ride. As an example and not by way of limitation, when the transportation management system 960 receives a request to travel from San Francisco International Airport (SFO) to Palo Alto, California, the system 960 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 960. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, etc.), a category/class of users (e.g., based on demographics), and/or all users of the system 960. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 960 in particular embodiments may predict and provide ride suggestions in response to a ride request. In particular embodiments, the system 960 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data.

In particular embodiments, transportation management system 960 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 960 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 930 (which may belong to a ride requestor or provider), a transportation management system 960, vehicle system 940, or a third-party system 970 to process, transform, manage, retrieve, modify, add, or delete the information stored in the data store.

In particular embodiments, transportation management system 960 may include an authorization server (or any other suitable component(s)) that allows users 901 to opt-in to or opt-out of having their information and actions logged, recorded, or sensed by transportation management system 960 or shared with other systems (e.g., third-party systems 970). In particular embodiments, a user 901 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 901 of transportation management system 960 through blocking, data hashing, anonymization, or other suitable techniques as appropriate.

In particular embodiments, third-party system 970 may be a network-addressable computing system that may provide HD maps or host GPS maps, customer reviews, music or content, weather information, or any other suitable type of information. Third-party system 970 may generate, store, receive, and send relevant data, such as, for example, map data, customer review data from a customer review website, weather data, or any other suitable type of data. Third-party system 970 may be accessed by the other computing entities of the network environment either directly or via network 910. For example, user device 930 may access the third-party system 970 via network 910, or via transportation management system 960. In the latter case, if credentials are required to access the third-party system 970, the user 901 may provide such information to the transportation management system 960, which may serve as a proxy for accessing content from the third-party system 970.

In particular embodiments, user device 930 may be a mobile computing device such as a smartphone, tablet computer, or laptop computer. User device 930 may include one or more processors (e.g., CPU and/or GPU), memory, and storage. An operating system and applications may be installed on the user device 930, such as, e.g., a transportation application associated with the transportation management system 960, applications associated with third-party systems 970, and applications associated with the operating system. User device 930 may include functionality for determining its location, direction, or orientation, based on integrated sensors such as GPS, compass, gyroscope, or accelerometer. User device 930 may also include wireless transceivers for wireless communication and may support wireless communication protocols such as Bluetooth, near-field communication (NFC), infrared (IR) communication, WI-FI, and/or 2G/3G/4G/LTE mobile communication standard. User device 930 may also include one or more cameras, scanners, touchscreens, microphones, speakers, and any other suitable input-output devices.

In particular embodiments, the vehicle 940 may be an autonomous vehicle and equipped with an array of sensors 944, a navigation system 946, and a ride-service computing device 948. In particular embodiments, a fleet of autonomous vehicles 940 may be managed by the transportation management system 960. The fleet of autonomous vehicles 940, in whole or in part, may be owned by the entity associated with the transportation management system 960, or they may be owned by a third-party entity relative to the transportation management system 960. In either case, the transportation management system 960 may control the operations of the autonomous vehicles 940, including, e.g., dispatching select vehicles 940 to fulfill ride requests, instructing the vehicles 940 to perform select operations (e.g., head to a service center or charging/fueling station, pull over, stop immediately, self-diagnose, lock/unlock compartments, change music station, change temperature, and any other suitable operations), and instructing the vehicles 940 to enter select operation modes (e.g., operate normally, drive at a reduced speed, drive under the command of human operators, and any other suitable operational modes).

In particular embodiments, the autonomous vehicles 940 may receive data from and transmit data to the transportation management system 960 and the third-party system 970. Example of received data may include, e.g., instructions, new software or software updates, maps, 3D models, trained or untrained machine-learning models, location information (e.g., location of the ride requestor, the autonomous vehicle 940 itself, other autonomous vehicles 940, and target destinations such as service centers), navigation information, traffic information, weather information, entertainment content (e.g., music, video, and news) ride requestor information, ride information, and any other suitable information. Examples of data transmitted from the autonomous vehicle 940 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 940, passengers may send/receive data to the transportation management system 960 and/or third-party system 970), and any other suitable data.

In particular embodiments, autonomous vehicles 940 may also communicate with each other as well as other traditional human-driven vehicles, including those managed and not managed by the transportation management system 960. For example, one vehicle 940 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) and/or over a network (e.g., the Internet or via the transportation management system 960 or third-party system 970).

In particular embodiments, an autonomous vehicle 940 may obtain and process sensor/telemetry data. Such data may be captured by any suitable sensors. For example, the vehicle 940 may have aa Light Detection and Ranging (LiDAR) sensor array of multiple LiDAR transceivers that are configured to rotate 360°, emitting pulsed laser light and measuring the reflected light from objects surrounding vehicle 940. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. A LiDAR is an effective sensor for measuring distances to targets, and as such may be used to generate a three-dimensional (3D) model of the external environment of the autonomous vehicle 940. As an example and not by way of limitation, the 3D model may represent the external environment including objects such as other cars, curbs, debris, objects, and pedestrians up to a maximum range of the sensor arrangement (e.g., 50, 100, or 200 meters). As another example, the autonomous vehicle 940 may have optical cameras pointing in different directions. The cameras may be used for, e.g., recognizing roads, lane markings, street signs, traffic lights, police, other vehicles, and any other visible objects of interest. To enable the vehicle 940 to "see" at night, infrared cameras may be installed. In particular embodiments, the vehicle may be equipped with stereo vision for, e.g., spotting hazards such as pedestrians or tree branches on the road. As another example, the vehicle 940 may have radars for, e.g., detecting other vehicles and/or hazards afar. Furthermore, the vehicle 940 may have ultrasound equipment for, e.g., parking and obstacle detection. In addition to sensors enabling the vehicle 940 to detect, measure, and understand the external world around it, the vehicle 940 may further be equipped with sensors for detecting and self-diagnosing the vehicle's own state and condition. For example, the vehicle 940 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, an autonomous vehicle 940 may build a 3D model of its surrounding based on data from its LiDAR, radar, sonar, and cameras, along with a pre-generated map obtained from the transportation management system 960 or the third-party system 970. Although sensors 944 appear in a particular location on autonomous vehicle 940 in FIG. 9, sensors 944 may be located in any suitable location in or on autonomous vehicle 940. Example locations for sensors include the front and rear bumpers, the doors, the front windshield, on the side panel, or any other suitable location.

In particular embodiments, the autonomous vehicle 940 may be equipped with a processing unit (e.g., one or more CPUs and GPUs), memory, and storage. The vehicle 940 may thus be equipped to perform a variety of computational and processing tasks, including processing the sensor data, extracting useful information, and operating accordingly. For example, based on images captured by its cameras and a machine-vision model, the vehicle 940 may identify particular types of objects captured by the images, such as pedestrians, other vehicles, lanes, curbs, and any other objects of interest.

In particular embodiments, the autonomous vehicle 940 may have a navigation system 946 responsible for safely navigating the autonomous vehicle 940. In particular embodiments, the navigation system 946 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 946 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 946 may use its determinations to control the vehicle 940 to operate in prescribed manners and to guide the autonomous vehicle 940 to its destinations without colliding into other objects. Although the physical embodiment of the navigation system 946 (e.g., the processing unit) appears in a particular location on autonomous vehicle 940 in FIG. 9, navigation system 946 may be located in any suitable location in or on autonomous vehicle 940. Example locations for navigation system 946 include inside the cabin or passenger compartment of autonomous vehicle 940, near the engine/battery, near the front seats, rear seats, or in any other suitable location.

In particular embodiments, the autonomous vehicle 940 may be equipped with a ride-service computing device 948, which may be a tablet or any other suitable device installed by transportation management system 960 to allow the user to interact with the autonomous vehicle 940, transportation management system 960, other users 901, or third-party systems 970. In particular embodiments, installation of ride-service computing device 948 may be accomplished by placing the ride-service computing device 948 inside autonomous vehicle 940, and configuring it to communicate with the vehicle 940 via a wire or wireless connection (e.g., via Bluetooth). Although FIG. 9 illustrates a single ride-service computing device 948 at a particular location in autonomous vehicle 940, autonomous vehicle 940 may include several ride-service computing devices 948 in several different locations within the vehicle. As an example and not by way of limitation, autonomous vehicle 940 may include four ride-service computing devices 948 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 948 may be detachable from any component of autonomous vehicle 940. This may allow users to handle ride-service computing device 948 in a manner consistent with other tablet computing devices. As an example and not by way of limitation, a user may move ride-service computing device 948 to any location in the cabin or passenger compartment of autonomous vehicle 940, may hold ride-service computing device 948, or handle ride-service computing device 948 in any other suitable manner. Although this disclosure describes providing a particular computing device in a particular manner, this disclosure contemplates providing any suitable computing device in any suitable manner.

Figure 10:
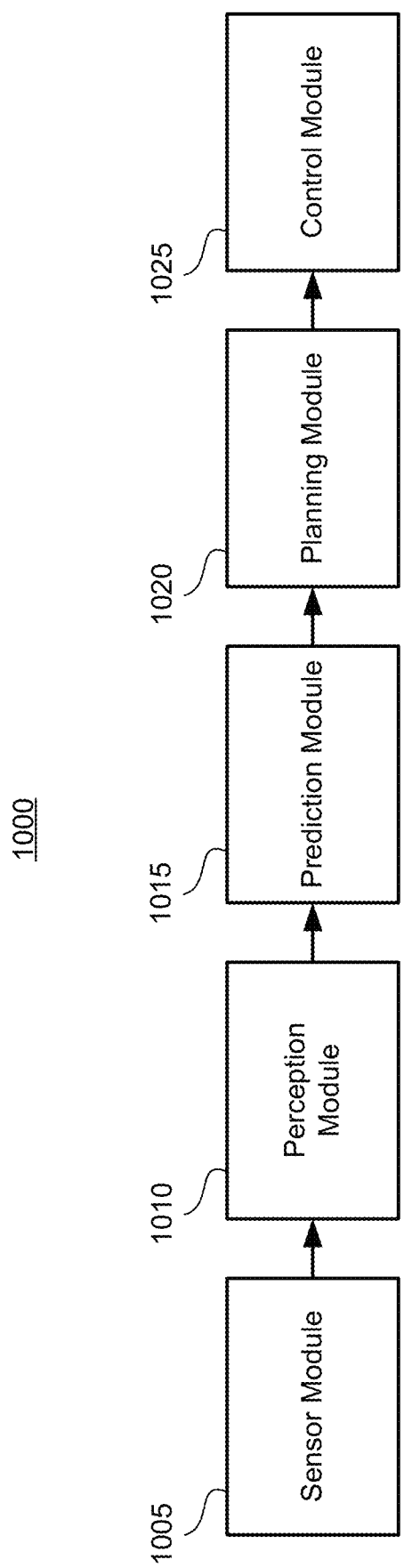
FIG. 10 illustrates an example block diagram of an algorithmic navigation pipeline.

FIG. 10 illustrates an example block diagram of an algorithmic navigation pipeline. In particular embodiments, an algorithmic navigation pipeline 1000 may include a number of computing modules, such as a sensor data module 1005, perception module 1010, prediction module 1015, planning module 1020, and control module 1025. Sensor data module 1005 may obtain and pre-process sensor/telemetry data that is provided to perception module 1010. Such data may be captured by any suitable sensors of a vehicle. As an example and not by way of limitation, the vehicle may have a Light Detection and Ranging (LiDAR) sensor that is configured to transmit pulsed laser beams in multiple directions and measure the reflected signal from objects surrounding vehicle. The time of flight of the light signals may be used to measure the distance or depth of the objects from the LiDAR. As another example, the vehicle may have optical cameras pointing in different directions to capture images of the vehicle's surrounding. Radars may also be used by the vehicle for detecting other vehicles and/or hazards at a distance. As further examples, the vehicle may be equipped with ultrasound for close range object detection, e.g., parking and obstacle detection or infrared cameras for object detection in low-light situations or darkness. In particular embodiments, sensor data module 1005 may suppress noise in the sensor data or normalize the sensor data.

Perception module 1010 is responsible for correlating and fusing the data from the different types of sensors of the sensor module 1005 to model the contextual environment of the vehicle. Perception module 1010 may use information extracted by multiple independent sensors to provide information that would not be available from any single type of sensors. Combining data from multiple sensor types allows the perception module 1010 to leverage the strengths of different sensors and more accurately and precisely perceive the environment. As an example and not by way of limitation, image-based object recognition may not work well in low-light conditions. This may be compensated by sensor data from LiDAR or radar, which are effective sensors for measuring distances to targets in low-light conditions. As another example, image-based object recognition may mistakenly determine that an object depicted in a poster is an actual three-dimensional object in the environment. However, if depth information from a LiDAR is also available, the perception module 1010 could use that additional information to determine that the object in the poster is not, in fact, a three-dimensional object.

Perception module 1010 may process the available data (e.g., sensor data, data from a high-definition map, etc.) to derive information about the contextual environment. For example, perception module 1010 may include one or more agent modelers (e.g., object detectors, object classifiers, or machine-learning models trained to derive information from the sensor data) to detect and/or classify agents present in the environment of the vehicle (e.g., other vehicles, pedestrians, moving objects). Perception module 1010 may also determine various characteristics of the agents. For example, perception module 1010 may track the velocities, moving directions, accelerations, trajectories, relative distances, or relative positions of these agents. In particular embodiments, the perception module 1010 may also leverage information from a high-definition map. The high-definition map may include a precise three-dimensional model of the environment, including buildings, curbs, street signs, traffic lights, and any stationary fixtures in the environment. Using the vehicle's GPS data and/or image-based localization techniques (e.g., simultaneous localization and mapping, or SLAM), the perception module 1010 could determine the pose (e.g., position and orientation) of the vehicle or the poses of the vehicle's sensors within the high-definition map. The pose information, in turn, may be used by the perception module 1010 to query the high-definition map and determine what objects are expected to be in the environment.

Perception module 1010 may use the sensor data from one or more types of sensors and/or information derived therefrom to generate a representation of the contextual environment of the vehicle. As an example and not by way of limitation, the representation of the external environment may include objects such as other vehicles, curbs, debris, objects, and pedestrians. The contextual representation may be limited to a maximum range of the sensor array (e.g., 50, 1000, or 200 meters). The representation of the contextual environment may include information about the agents and objects surrounding the vehicle, as well as semantic information about the traffic lanes, traffic rules, traffic signs, time of day, weather, and/or any other suitable information. The contextual environment may be represented in any suitable manner. As an example and not by way of limitation, the contextual representation may be encoded as a vector or matrix of numerical values, with each value in the vector/matrix corresponding to a predetermined category of information. For example, each agent in the environment may be represented by a sequence of values, starting with the agent's coordinate, classification (e.g., vehicle, pedestrian, etc.), orientation, velocity, trajectory, and so on. Alternatively, information about the contextual environment may be represented by a raster image that visually depicts the agent, semantic information, etc. For example, the raster image may be a birds-eye view of the vehicle and its surrounding, up to a predetermined distance. The raster image may include visual information (e.g., bounding boxes, color-coded shapes, etc.) that represent various data of interest (e.g., vehicles, pedestrians, lanes, buildings, etc.).

The representation of the present contextual environment from the perception module 1010 may be consumed by a prediction module 1015 to generate one or more predictions of the future environment. For example, given a representation of the contextual environment at time to, the prediction module 1015 may output another contextual representation for time $t_1$. For instance, if the to contextual environment is represented by a raster image, the output of the prediction module 1015 may be another raster image (e.g., a snapshot of the current environment) that depicts where the agents would be at time $t_1$ (e.g., a snapshot of the future). In particular embodiments, prediction module 1015 may include a machine-learning model (e.g., a convolutional neural network, a neural network, a decision tree, support vector machines, etc.) that may be trained based on previously recorded contextual and sensor data. For example, one training sample may be generated based on a sequence of actual sensor data captured by a vehicle at times $t_0$ and $t_1$. The captured data at times to and $t_1$ may be used to generate, respectively, a first contextual representation (the training data) and a second contextual representation (the associated ground-truth used for training). During training, the machine-learning model may process the first contextual representation using the model's current configuration parameters and output a predicted contextual representation. The predicted contextual representation may then be compared to the known second contextual representation (i.e., the ground-truth at time $t_1$). The comparison may be quantified by a loss value, computed using a loss function. The loss value may be used (e.g., via back-propagation techniques) to update the configuration parameters of the machine-learning model so that the loss would be less if the prediction were to be made again. The machine-learning model may be trained iteratively using a large set of training samples until a convergence or termination condition is met. For example, training may terminate when the loss value is below a predetermined threshold. Once trained, the machine-learning model may be used to generate predictions of future contextual representations based on current contextual representations.

Planning module 1020 may determine the navigation routes and particular driving operations (e.g., slowing down, speeding up, stopping, swerving, etc.) of the vehicle based on the predicted contextual representation generated by the prediction module 1015. In particular embodiments, planning module 1020 may utilize the predicted information encoded within the predicted contextual representation (e.g., predicted location or trajectory of agents, semantic data, etc.) and any other available information (e.g., map data, traffic data, accident reports, weather reports, target destinations, and any other suitable information) to determine one or more goals or navigation instructions for the vehicle. As an example and not by way of limitation, based on the predicted behavior of the agents surrounding the vehicle and the traffic data to a particular destination, planning module 1020 may determine a particular navigation path and associated driving operations for the vehicle to avoid possible collisions with one or more agents.

In particular embodiments, planning module 1020 may generate, based on a given predicted contextual representation, several different plans (e.g., goals or navigation instructions) for the vehicle. For each plan, the planning module 1020 may compute a score that represents the desirability of that plan. For example, if the plan would likely result in the vehicle colliding with an agent at a predicted location for that agent, as determined based on the predicted contextual representation, the score for the plan may be penalized accordingly. Another plan that would cause the vehicle to violate traffic rules or take a lengthy detour to avoid possible collisions may also have a score that is penalized, but the penalty may be less severe than the penalty applied for the previous plan that would result in collision. A third plan that causes the vehicle to simply stop or change lanes to avoid colliding with the agent in the predicted future may receive the highest score. Based on the assigned scores for the plans, the planning module 1020 may select the best plan to carry out. While the example above used collision as an example, the disclosure herein contemplates the use of any suitable scoring criteria, such as travel distance or time, fuel economy, changes to the estimated time of arrival at the destination, passenger comfort, proximity to other vehicles, the confidence score associated with the predicted contextual representation, etc.

Based on the plan generated by planning module 1020, which may include one or more navigation path or associated driving operations, control module 1025 may determine the specific commands to be issued to the actuators of the vehicle. The actuators of the vehicle are components that are responsible for moving and controlling the vehicle. The actuators control driving functions of the vehicle, such as for example, steering, turn signals, deceleration (braking), acceleration, gear shift, etc. As an example and not by way of limitation, control module 1025 may transmit commands to a steering actuator to maintain a particular steering angle for a particular amount of time to move a vehicle on a particular trajectory to avoid agents predicted to encroach into the area of the vehicle. As another example, control module 1025 may transmit commands to an accelerator actuator to have the vehicle safely avoid agents predicted to encroach into the area of the vehicle.

Figure 11:
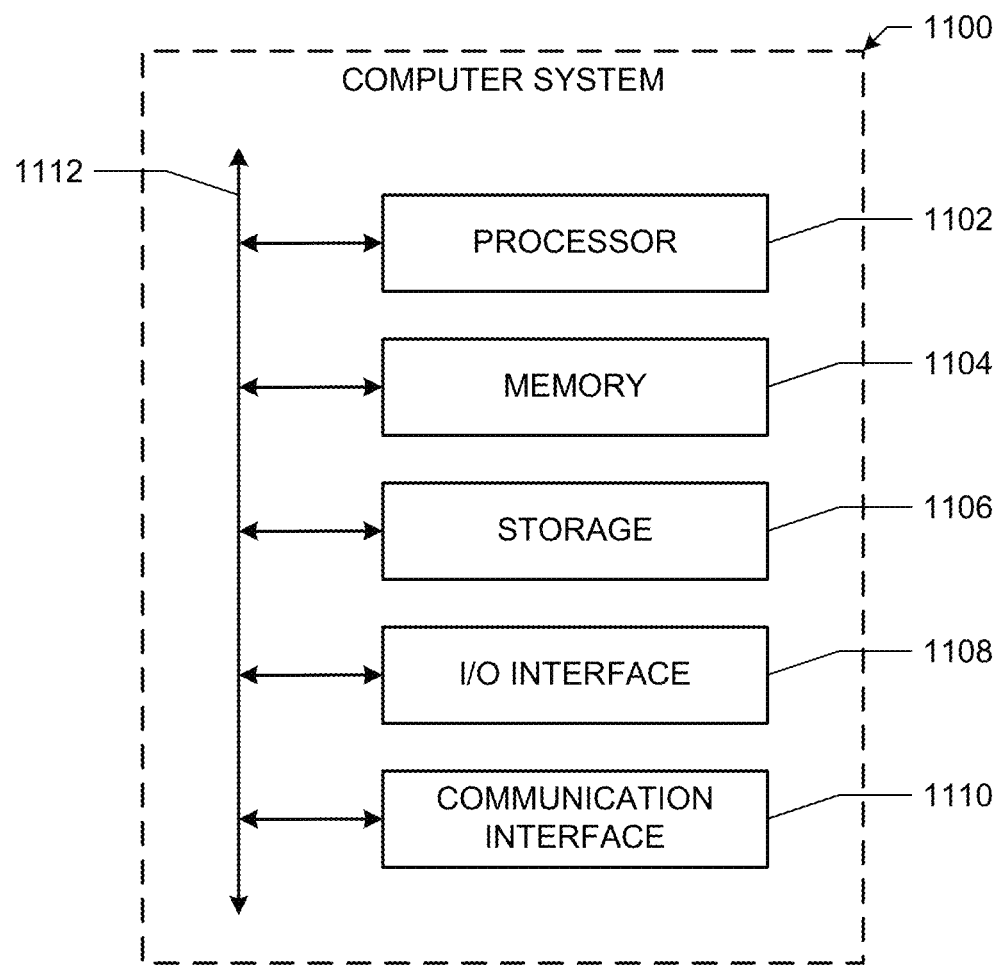
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide the functionalities described or illustrated herein. In particular embodiments, software running on one or more computer systems 1100 performs one or more steps of one or more methods described or illustrated herein or provides the functionalities described or illustrated herein. Particular embodiments include one or more portions of one or more computer systems 1100. Herein, a reference to a computer system may encompass a computing device, and vice versa, where appropriate. Moreover, a reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 that are to be operated on by computer instructions; the results of previous instructions executed by processor 1102 that are accessible to subsequent instructions or for writing to memory 1104 or storage 1106; or any other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs), be a multi-core processor, or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described in further detail below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system associated with a vehicle:
    identifying one or more first sets of model parameters that are predefined from a prior training associated with a first region which is a current location of the vehicle and configuring one or more machine-learning models with the one or more first sets of model parameters;
    switching the one or more machine-learning models from the first sets of model parameters to one or more second sets of model parameters that are predefined from a prior training associated with a second region upon determining the current location is in the second region, wherein the one or more first sets of model parameters and the one or more second sets of model parameters are learned weights of the one or more machine learning models;
    generating, using the one or more machine-learning models configured with the one or more second sets of model parameters, inferences based on sensor data generated by sensors of the vehicle when the vehicle is in the second region;
    causing the vehicle to perform operations according to the inferences; and
    dividing the second region into at least two subregions with new parameters when an assessed performance of the second sets of model parameters with the machine-learning models indicates performance below a minimum threshold.

2. The method of claim 1, wherein the first sets of model parameters and the second sets of model parameters are generated by training the one or more machine learning models based on previously-captured sensor data collected in the first and second regions, respectively and from back-propagation of a loss value generated by a loss function during training.

3. The method of claim 2, wherein the one or more machine learning models comprise one or more perception models trained to identify, based on the first or second sensor data, one or more types of objects in the first or second regions, respectively.

4. The method of claim 3, wherein the perception models comprise a plurality of perception models trained based on a plurality of lighting conditions, a plurality of weather conditions, a plurality of times of day, or a combination thereof.

5. The method of claim 4, wherein identifying the first sets and the second sets of model parameters further comprises identifying, in a data store, the first and second sets of model parameters that are associated with current lighting conditions in an environment of the vehicle, weather conditions in the environment, time of day, or a combination thereof.

6. The method of claim 5, wherein the lighting conditions, weather conditions, time of day, or a combination thereof, associated with the first sets and the second sets of model parameters were determined when the first sets and second sets of model parameters were generated by training the perception models.

7. The method of claim 2, wherein the one or more machine learning models comprise one or more prediction models trained to predict one or more trajectories of one or more objects represented in the first or second sensor data.

8. The method of claim 7, wherein the prediction models having configurations based on the corresponding first sets of model parameters associated with the first regions are trained to predict the trajectories based on observed trajectories of objects captured in the past in the first regions.

9. The method of claim 2, wherein the one or more machine learning models comprise one or more planning models trained to identify, based on the first or second sensor data, one or more vehicle trajectories for maneuvering through an environment of the vehicle in the first or second regions, respectively.

10. The method of claim 9, wherein the one or more vehicle trajectories comprise a plurality of vehicle trajectories resulting in a corresponding plurality of different maneuvers being performed.

11. The method of claim 1, wherein identifying the first sets and the second sets of model parameters comprises retrieving the first and second sets of model parameters from a data store, wherein the first and second sets of model parameters are associated in the data store with the first and second regions, respectively, and wherein switching includes removing the first sets of model parameters from the machine-learning models and inserting the one or more second sets.

12. The method of claim 1, wherein the first region is separated from the second region by a region boundary, and switching the one or more models from the first sets of model parameters to the second sets of model parameters is in response to the vehicle being located less than a first threshold distance from, the region boundary, the method further comprising:
  in response to determining, based on the current location and a current heading of the vehicle, that the vehicle is less than a second threshold distance from the region boundary, wherein the second threshold distance is greater than the first threshold distance:
    loading the second sets of model parameters from a data store into a memory device on the vehicle.

13. The method of claim 1, wherein the first and second sets of model parameters are loaded into a memory device on the vehicle for predetermined sets of first and second regions, wherein the predetermined sets are determined based on a route plan of the vehicle.

14. The method of claim 1, wherein each of the first and second regions is specified as a geographical area, a road segment, an intersection, or a combination thereof.

15. The method of claim 1, further comprising:
  identifying a region of a map for which performance of a generalized machine-learning model is to be assessed;
  determining, using the generalized machine-learning model configured in accordance with a set of generalized model parameters associated with the map, an assessed performance of the generalized machine-learning model for the region of the map;
  determining that the assessed performance of the generalized machine-learning model for the region of the map is below a minimum performance threshold;
  generating a localized machine-learning model having a set of localized model parameters; and
  associating the localized machine-learning model with the region of the map for use in generating one or more subsequent inferences in the region of the map.

16. The method of claim 1, further comprising:
  assessing a performance of the second sets of model parameters for the second region according to a performance metric that assesses at least characteristics of control of the vehicle within the second region.

17. A system comprising: one or more processors and one or more computer-readable non-transitory storage media coupled to one or more of the processors, the one or more computer-readable non-transitory storage media comprising instructions operable when executed by one or more of the processors to cause the system to:
  determine whether a current location of a vehicle is in a first region;
  identify one or more first sets of model parameters that are predefined from a prior training associated with the first region and configuring one or more machine-learning models with the one or more first sets of model parameters;
  switch the one or more machine-learning models from the one or more first sets of model parameters to one or more second sets of model parameters that are predefined from a prior training associated with a second region upon determining the current location is in the second region, wherein the one or more first sets of model parameters and the one or more second sets of model parameters are learned weights of the one or more machine learning models;
  generate, using the one or more machine-learning models configured with the one or more second sets of model parameters, one or more corresponding inferences based on second sensor data generated by sensors of the vehicle when the vehicle is in the second region;
  cause the vehicle to perform one or more operations based at least on the inferences; and
  divide the second region into at least two subregions with new parameters when an assessed performance of the second sets of model parameters with the machine-learning models indicates performance below a minimum threshold.

18. The system of claim 17, wherein the first sets of model parameters and the second sets of model parameters are generated by training the one or more machine learning models based on previously-captured sensor data collected in the first and second regions, respectively.

19. One or more computer-readable non-transitory storage media embodying software that is operable when executed to cause one or more processors to perform operations comprising:
  determining whether a current location of a vehicle is in a first region;
  identifying one or more first sets of model parameters that are predefined from a prior training associated with the first region and configuring one or more machine-learning models with the one or more first sets of model parameters;
  switching the one or more machine-learning models from the one or more first sets of model parameters to one or more second sets of model parameters that are predefined from a prior training associated with a second region upon determining the current location is in the second region, wherein the one or more first sets of model parameters and the one or more second sets of model parameters are learned weights of the one or more machine learning models;
  generating, using the one or more machine-learning models configured with the one or more second sets of model parameters, one or more corresponding inferences based on second sensor data generated by sensors of the vehicle when the vehicle is in the second region;
  causing the vehicle to perform one or more operations based at least on the inferences; and
  dividing the second region into at least two subregions with new parameters when an assessed performance of the second set of parameters with the machine-learning models indicates performance below a minimum threshold.

20. The one or more computer-readable non-transitory storage media of claim 19, wherein the first sets of model parameters and the second sets of model parameters are generated by training the one or more machine learning models based on previously-captured sensor data collected in the first and second regions, respectively.

* * * * *